US007641308B2

(12) United States Patent
Mitsuzawa

(10) Patent No.: US 7,641,308 B2
(45) Date of Patent: Jan. 5, 2010

(54) PRINTING METHOD, PRINTING APPARATUS, PRINTING CONTROL APPARATUS AND STORAGE MEDIUM

(75) Inventor: Toyohiko Mitsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 202 days.

(21) Appl. No.: 11/405,463

(22) Filed: Apr. 18, 2006

(65) Prior Publication Data
US 2006/0250424 A1 Nov. 9, 2006

(30) Foreign Application Priority Data
Apr. 18, 2005 (JP) ............................. 2005-120205

(51) Int. Cl.
*B41J 2/15* (2006.01)
(52) U.S. Cl. .................. 347/41; 347/5; 347/40
(58) Field of Classification Search ............ 347/40, 347/41, 42, 5, 9
See application file for complete search history.

(56) References Cited

U.S. PATENT DOCUMENTS 6,390,598 B2 * 5/2002 Sato et al. .................... 347/41

FOREIGN PATENT DOCUMENTS

JP 10-323978 A 12/1998
JP 2002-011859 A 1/2002

* cited by examiner

Primary Examiner—Lam S Nguyen
(74) Attorney, Agent, or Firm—Sughrue Mion, PLLC

(57) ABSTRACT

A printing method includes: preparing a printing apparatus provided with a carry unit that carries a medium in a carrying direction, and a plurality of nozzle groups that have respectively a plurality of nozzles lined up in the carrying direction; and printing an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of rows of dots, lined up in the carrying direction, that are configured by a plurality of dots lined up in the moving direction, wherein in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group forms a larger number of dots configuring the certain row of dots than each nozzle of the another nozzle group.

11 Claims, 20 Drawing Sheets

| TYPE | NOZZLE GROUP | | PASS NUMBER | |
|---|---|---|---|---|
| | FIRST | SECOND | UPPER END PRINTING | NORMAL PRINTING |
| I | 2 | 0 | 2 | 0 |
| II | 3 | 0 | 3 | 0 |
| III | 3 | 0 | 2 | 1 |
| IV | 2 | 1 | 3 | 0 |
| V | 2 | 1 | 2 | 1 |
| VI | 1 | 1 | 2 | 0 |
| VII | 1 | 1 | 1 | 1 |
| VIII | 2 | 1 | 1 | 2 |
| IX | 1 | 1 | 0 | 2 |
| X | 2 | 1 | 0 | 3 |
| XI | 1 | 2 | 0 | 3 |

FIG. 18

PRINTING METHOD, PRINTING APPARATUS, PRINTING CONTROL APPARATUS AND STORAGE MEDIUM

CROSS-REFERENCE TO RELATED APPLICATIONS

The present application claims priority upon Japanese Patent Application No. 2005-120205 filed on Apr. 18, 2005, which is herein incorporated by reference.

BACKGROUND

1. Technical Field

The present invention relates to printing methods, printing apparatuses, printing control apparatuses, and storage media.

2. Related Art

A printing apparatus such as an inkjet printer prints an image to be printed on a medium by alternately repeating a dot forming process for forming dots by ejecting ink from a nozzle that moves in a moving direction, and a carrying process for carrying a medium such as paper in a carrying direction, thereby successively arranging in the carrying direction raster lines that are configured by a plurality of dots lined up in the moving direction.

In order to increase the print speed, it is desirable to increase the number of nozzles so that the number of raster lines formed by a single dot forming process can be increased. Therefore, it is proposed to provide a plurality of nozzle groups in the head so as to increase the number of nozzles easily (See JP-A-10-323978).

While printing methods such as "interlace printing" or "overlap printing" are known, there is another printing method called "non-uniform overlap printing" (See JP-A-2002-11859). In this "non-uniform overlap printing", the number of nozzles used to form a raster line differs according to the raster line. For example, two nozzles are used to form a certain raster line, but three nozzles are used to form another raster line.

When the "non-uniform overlap printing" is performed using a plurality of nozzle groups, for example, it is possible that a certain raster line is formed by one nozzle of a first nozzle group and one nozzle of a second nozzle group, and another raster line is formed by two nozzles of the first nozzle group and one nozzle of the second nozzle group. In the latter raster line, the number of dots formed by the nozzles of the first nozzle group is larger than that formed by the nozzles of the second nozzle group.

In other words, as the latter raster line, when the number of nozzles used to form a certain raster line differs for each nozzle group, the ratio of dots formed by the nozzles of a nozzle group that is a part of a plurality of nozzle groups may increase. As a result, that certain raster line reflects a strong effect of that particular nozzle group. When raster lines reflect strong effects of different nozzle groups, if the ink ejection characteristic of each nozzle group differs due to influence of irregularity in manufacturing, etc., densities in resultant raster lines may be inconsistent, and a striped pattern may appear in the printed image.

SUMMARY

The present invention has been devised in consideration of these issues, and it is an object thereof when printing is performed using a plurality of nozzle groups, to obtain a printed image of consistent image quality even with nozzle groups that have different ink ejection characteristics.

An aspect of the present invention for achieving the above-described object is a printing method including:

preparing a printing apparatus provided with a carry unit that carries a medium in a carrying direction, and a plurality of nozzle groups that have respectively a plurality of nozzles lined up in the carrying direction; and printing an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of rows of dots, lined up in the carrying direction, that are configured by a plurality of dots lined up in the moving direction, wherein in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group forms a larger number of dots configuring the certain row of dots than each nozzle of the another nozzle group.

Other features of the present invention will become clear by reading the description of the present specification with reference to the accompanying drawings.

BRIEF DESCRIPTION OF THE DRAWINGS

FIG. 18 is an explanatory diagram showing the types of raster lines.

DESCRIPTION OF EXEMPLARY EMBODIMENTS

Figure 1:
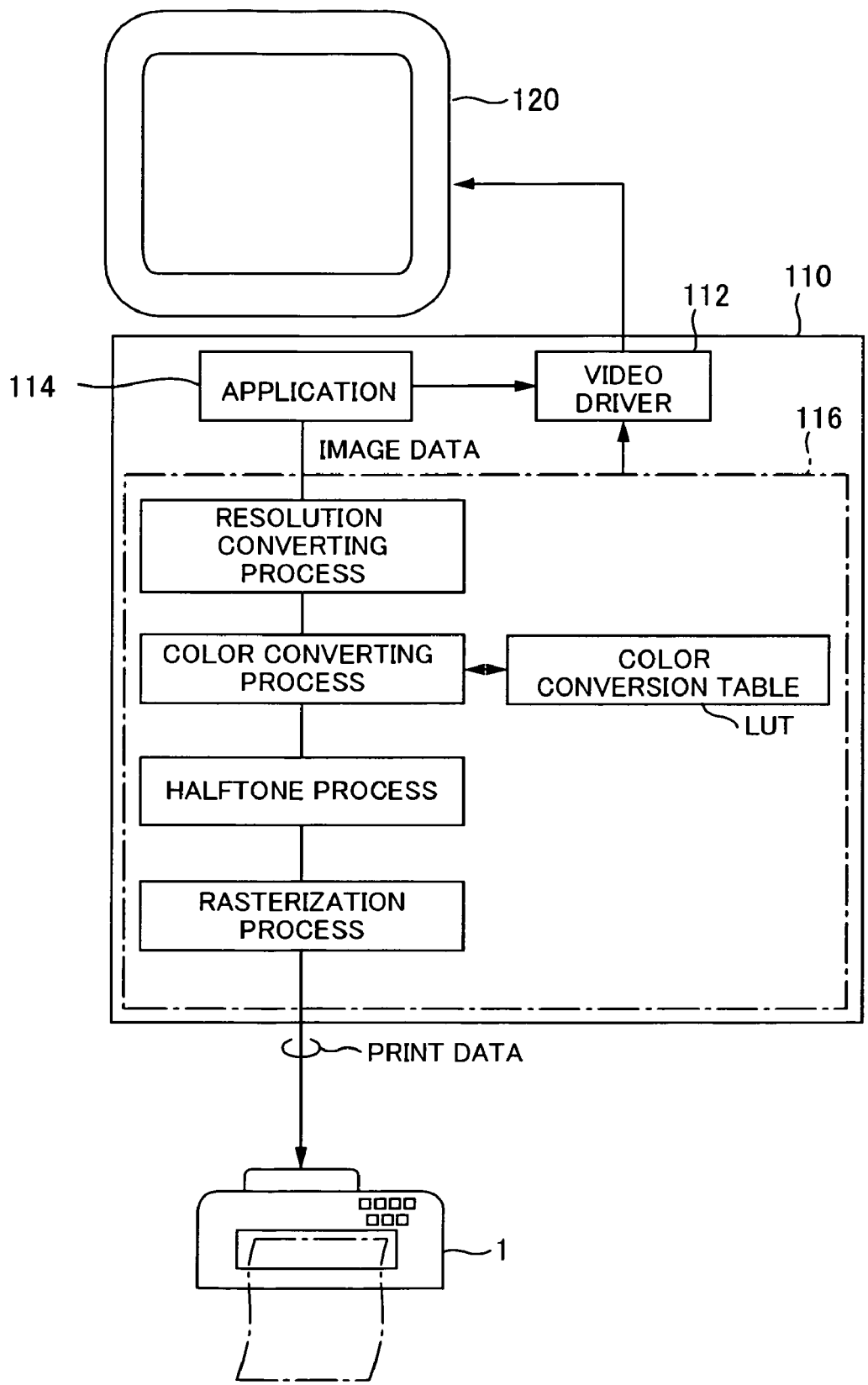
FIG. 1 is an explanatory diagram of the function of a computer 110.

At least the following matters will be made clear by the explanation in the present specification and the description of the accompanying drawings.

A printing method including:

preparing a printing apparatus provided with a carry unit that carries a medium in a carrying direction, and a plurality of nozzle groups that have respectively a plurality of nozzles lined up in the carrying direction; and printing an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of rows of dots, lined up in the carrying direction, that are configured by a plurality of dots lined up in the moving direction, wherein in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group forms a larger number of dots configuring the certain row of dots than each nozzle of the another nozzle group.

With such a printing method, it is possible to make image quality of printed images uniform.

In such a printing method, it is preferable that, in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, the nozzles of the another nozzle group, that form the certain row of dots, include a nozzle located in an end portion in the carrying direction in the another nozzle group. With such a printing method, the number of dots formed by nozzles that tend to have an ejection trouble can be reduced, thus suppressing deterioration of image quality.

In such a printing method, it is preferable that a nozzle located in a furthest downstream side in the carrying direction and a nozzle located in a furthest upstream side in the carrying direction of the another nozzle group form the certain row of dots. With such a printing method, it is possible to increase the print speed.

In such a printing method, it is preferable that a plurality of drive elements for causing ink to be ejected from the nozzles are provided respectively corresponding to each of a plurality of the nozzles, and drive elements corresponding to nozzles of different nozzle groups are each configured separately. In this way, even with a configuration in which the ink ejection characteristic tends to differ for each nozzle group, the extent of deterioration of image quality can be small.

In such a printing method, it is preferable that the number of nozzles that form a row of dots differs according to the row of dots. In this way, even in a case in which a striped pattern tends to appear in the printed image, deterioration in the image quality can be suppressed.

In such a printing method, it is preferable that with respect to dots configuring the certain row of dots, a ratio of dots formed by the nozzles of the certain nozzle group is equal to a ratio of dots formed by the nozzles of the another nozzle group. With such a printing method, the image quality of the printed image can be uniform.

In such a printing method, it is preferable that in a case the number of the nozzle of the certain nozzle group and the number of the nozzle of the another nozzle group that form a different row of dots from the certain row of dots are the same, a ratio of dots formed by nozzles of the another nozzle group to dots configuring the different row of dots is equal to a ratio of dots formed by nozzles of the another nozzle group to dots configuring the certain row of dots. With such a printing method, the image quality of the entire printed image can be uniform.

In such a printing method, it is preferable that each nozzle of the another nozzle group forms a half of the number of dots formed by each nozzle of the certain nozzle group.

It is possible to achieve a printing apparatus including:

(1) a carry unit that carries a medium in a carrying direction;

(2) a plurality of nozzle groups that have respectively a plurality of nozzles lined up in the carrying direction; and (3) a controller that causes to print an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of rows of dots, lined up in the carrying direction, that are configured by a plurality of dots lined up in the moving direction, wherein in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group is made to form a larger number of dots configuring the certain row of dots than each nozzle of the another nozzle group.

With such a printing apparatus, the image quality of the printed image can be uniform.

It is also possible to achieve a print control apparatus comprising a driver for controlling a printing apparatus, wherein the printing apparatus has:

a carry unit that carries a medium in a carrying direction, and a plurality of nozzle groups that have respectively a plurality of nozzles lined up in the carrying direction, wherein the driver causes to print an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of rows of dots, lined up in the carrying direction, that are configured by a plurality of dots lined up in the moving direction, and in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group forms a larger number of dots configuring the certain row of dots than each nozzle of the another nozzle group.

With such a printing control apparatus, the image quality of the printed image can be uniform.

It is also possible to achieve a storage medium storing a driver for controlling a printing apparatus wherein the printing apparatus has:

a carry unit that carries a medium in a carrying direction, and a plurality of nozzle groups that have respectively a plurality of nozzles lined up in the carrying direction, wherein the driver has:

a code for causing the printing apparatus to print an image to be printed on the medium by alternately repeating a dot forming process for forming dots on the medium by ejecting ink from each nozzle of a plurality of the nozzle groups that move in a moving direction, and a carrying process for carrying the medium in the carrying direction, and forming a plurality of the rows of dots, lined up in the carrying direction, that are configured by a plurality of dots lined up in the moving direction, and in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group, each nozzle of the certain nozzle group forms a larger number of dots configuring the certain row of dots than each nozzle of the another nozzle group.

With such a storage medium, it is possible to cause the printing apparatus to print an image to be printed in uniform image quality.

Configuration of the Printing System

An embodiment of the printing system is described next with reference to the drawings. However, the description of the following embodiment also encompasses implementations relating to a computer program and a storage medium storing the computer program, for example.

FIG. 1 is an explanatory diagram of the function of a computer 110 configuring a printing system. The printing system is provided with a printer 1, the computer 110, and a display device 120. The printer 1 is a printing apparatus for printing images on a medium such as paper, cloths, or films. The computer 110 is communicably connected to the printer 1, and outputs print data that corresponds to an image to be printed to the printer 1 to make the printer 1 print the image.

A printer driver is installed on the computer 110. The printer driver is a program to cause a user interface to be displayed on the display device 120, and cause image data outputted from an application program to be converted to print data.

On the computer 110, computer programs such as a video driver 112, an application program 114, and a printer driver 116 operate under an operating system installed on the computer. The video driver 112 has a function to display, for example, the user interface or the like on the display device 120 in accordance with display commands from the application program 114 or the printer driver 116. The application program 114, for example, has a function to perform image editing or the like and creates data related to an image (image data). A user can provide an instruction to print an image edited with the application program 114 via the user interface of the application program 114. Upon receiving the print instruction, the application program 114 outputs the image data to the printer driver 116.

The printer driver 116 receives image data from the application program 114, converts the image data to print data, and outputs the print data to the printer. Here, "print data" refers to data in a format that can be interpreted by the printer 1 and includes various command data and pixel data. Here, "command data" refers to data for instructing the printer to carry out a specific operation. Furthermore, "pixel data" refers to data related to pixels that configure an image to be printed (print image), for example, data related to dots to be formed in positions on the paper corresponding to certain pixels (data for dot color and size, for example).

In order to convert image data that is outputted from the application program 114 to print data, the printer driver 116 carries out processes such as resolution conversion, color conversion, halftoning, and rasterization. The following is a description of the various processes carried out by the printer driver 116.

Resolution conversion is a process in which image data (text data, image data, etc.) outputted from the application program 114 is converted to image data of a resolution for printing on paper. For example, when the resolution for printing an image on paper is specified as 720×720 dpi, then the image data received from the application program 114 are converted to image data of a resolution of 720×720 dpi. It should be noted that, after the resolution conversion process, the image data is multi-gradation RGB data (for example, 256 gradations) that is expressed using the RGB color space.

Color conversion is a process in which RGB data is converted to CMYK data that is expressed using the CMYK color space. It should be noted that CMYK data is data that corresponds to the colors of the ink of the printer. The color conversion process is carried out by the printer driver 116 referencing a table (a color conversion look-up table LUT) in which gradation values of RGB image data are associated with gradation values of CMYK image data. After color conversion process, the data is CMYK data with 256 gradations expressed using the CMYK color space.

Halftoning is a process in which data of a high number of gradations is converted to data of a number of gradations that can be formed by the printer. For example, through halftone process, data expressing 256 gradations is converted to 1-bit data expressing two gradations or 2-bit data expressing four gradations. Through the halftoning, pixel data is created such that the printer can form dots in a dispersed manner using methods such as dithering, gamma correction, and error diffusion. Halftone processed data has a resolution (for example, 720×720 dpi) equivalent to the above-mentioned RGB data.

Rasterization is a process in which image data in a matrix form is reordered into an order for transfer to the printer. Rasterized data is outputted to the printer as pixel data contained in print data.

Configuration of the Printers

Regarding the Configuration of the Inkjet Printer

Figure 2:
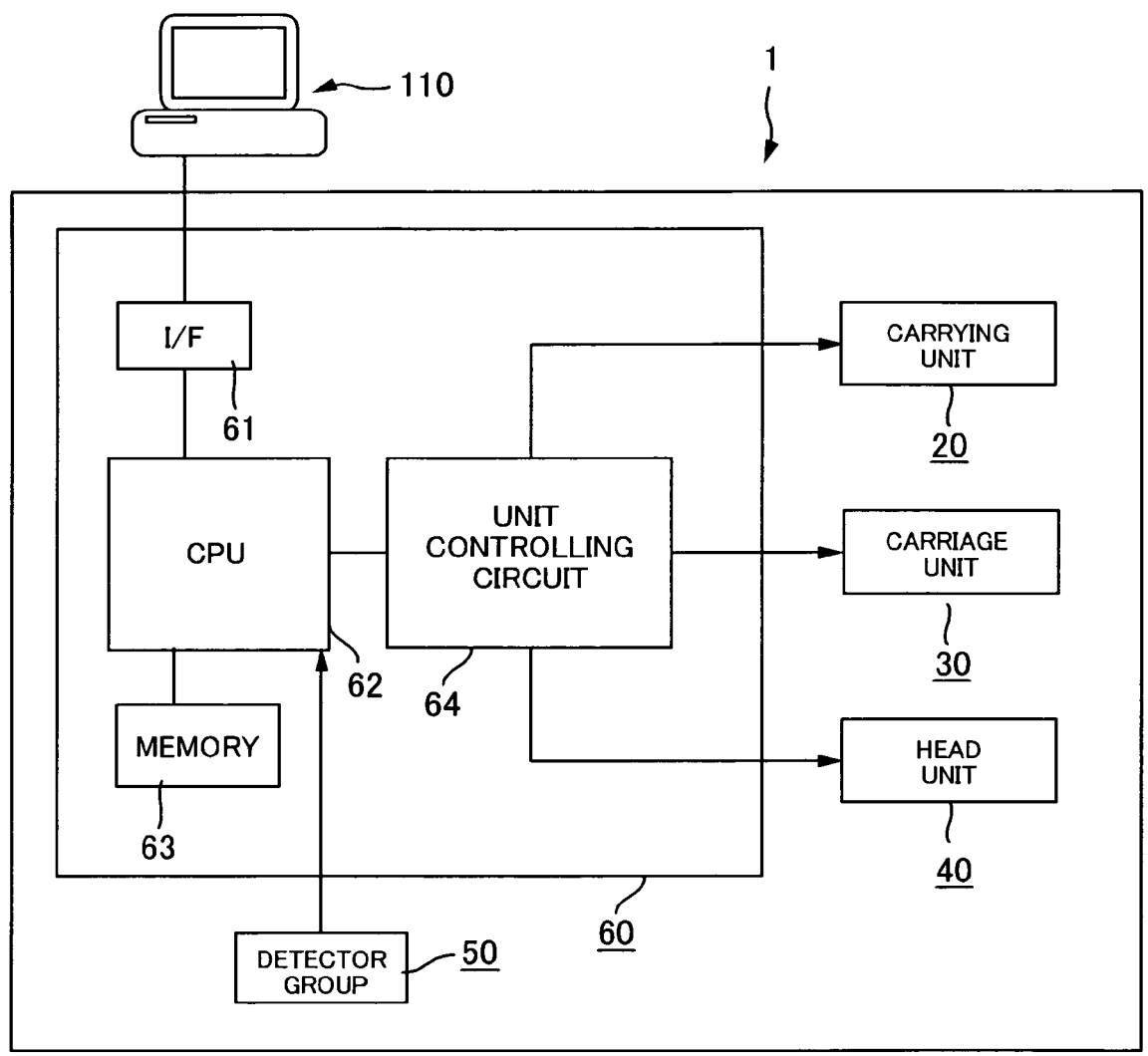
FIG. 2 is a block diagram of the overall configuration of a printer 1.
Figure 3A:
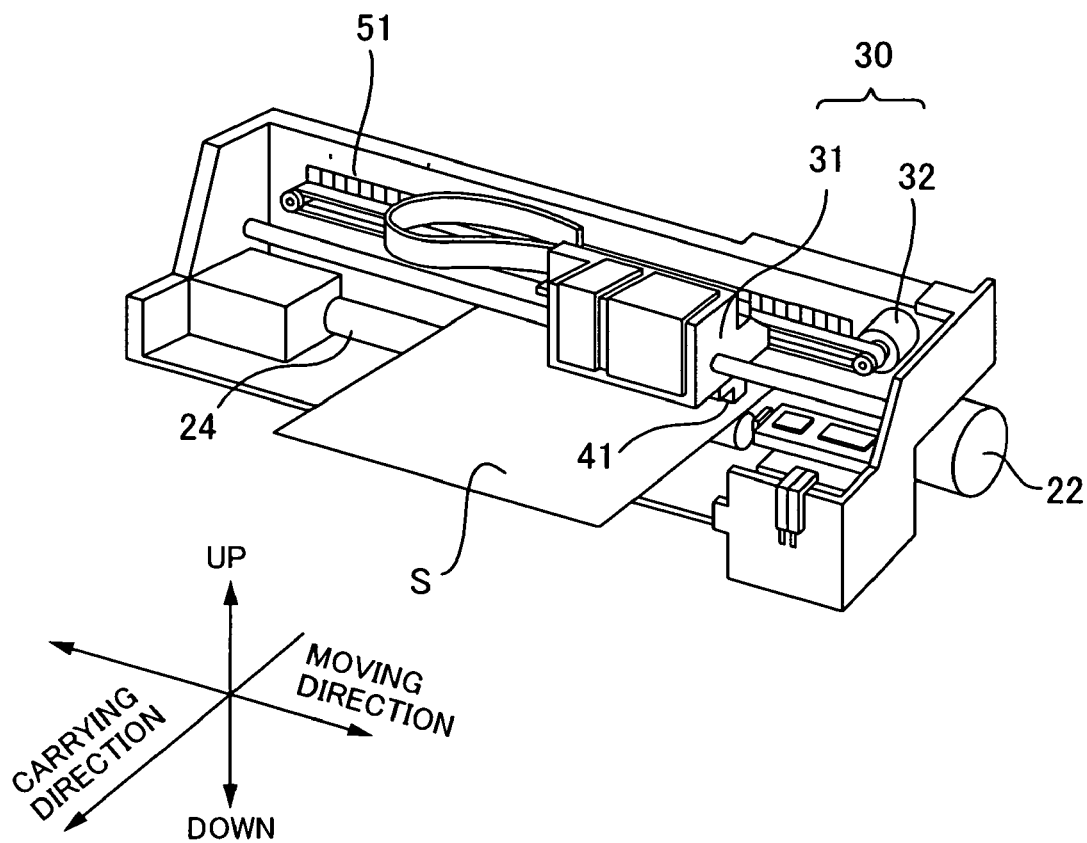
FIG. 3A is a schematic view of the overall configuration of the printer 1.
Figure 3B:
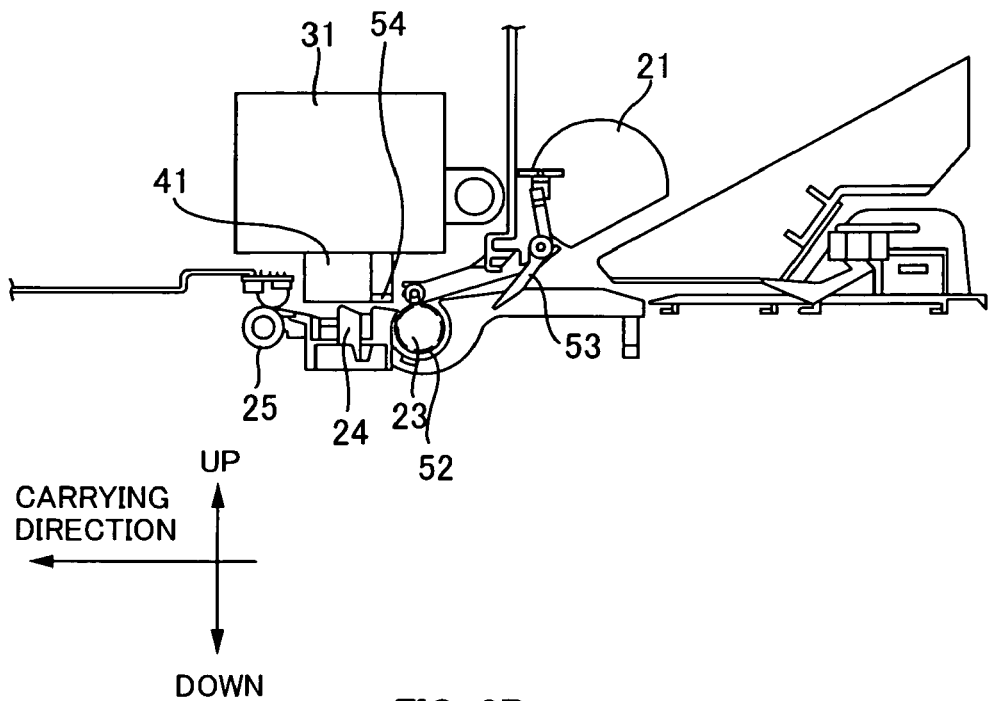
FIG. 3B is a transverse cross-sectional view of the overall configuration of the printer 1.

FIG. 2 is a block diagram of the overall configuration of the printer 1. FIG. 3A is a schematic view of the overall configuration of the printer 1. FIG. 3B is a transverse cross-sectional view of the overall configuration of the printer 1. The basic structure of the printer according to the present embodiment is described below.

The printer 1 of the present embodiment has a carry unit 20, a carriage unit 30, a head unit 40, a detector group 50, and a controller 60. The printer 1 that receives print data from the computer 110, which is an external device, controls the various units (the carry unit 20, the carriage unit 30, and the head unit 40) using the controller 60. The controller 60 controls the units in accordance with the print data that has been received from the computer 110 to form an image on paper. The detector group 50 monitors the conditions in the printer 1, and outputs the results of this detection to the controller 60. The controller 60 controls the units in accordance with the detection result that is outputted from the detector sensor 50.

The carry unit 20 is for carrying a medium (paper S, for example) in a predetermined direction (hereinafter referred to as "carrying direction"). The carry unit 20 has a paper supply roller 21, a carrying motor 22 (hereinafter also referred to as PF motor), a carry roller 23, a platen 24, and a paper-discharge roller 25. The paper supply roller 21 is a roller for supplying paper that has been inserted into a paper insert opening into the printer. The carry roller 23 is a roller for carrying the paper S that has been supplied by the paper supply roller 21 up to a printable region, and is driven by the carrying motor 22. The platen 24 supports the paper S on which printing is being performed. The paper-discharge roller 25 is a roller for discharging the paper S to outside the printer, and is provided on a downstream side in the carrying direction with respect to the printable region.

The carriage unit 30 is for making the head move (also referred to as "scan") in a predetermined direction (hereinafter, referred to as "moving direction"). The carriage unit 30 has a carriage 31 and a carriage motor 32 (also referred to as "CR motor"). The carriage 31 can move in a reciprocating manner along the moving direction, and is driven by the carriage motor 32. Further, the carriage 31 detachably retains an ink cartridge containing ink.

The head unit 40 is for ejecting ink onto paper. The head unit 40 is provided with a head 41 including a plurality of nozzles. The head 41 is provided on the carriage 31 so that when the carriage 31 moves in the moving direction, the head 41 also moves in the moving direction. Dot lines (raster lines) are formed on the paper in the moving direction as a result of the head 41 intermittently ejecting ink while moving in the moving direction.

The detector group 50 includes a linear encoder 51, a rotary encoder 52, a paper detection sensor 53, and an optical sensor 54, for example. The linear encoder 51 is for detecting the position of the carriage 31 in the moving direction. The rotary encoder 52 is for detecting the amount of rotation of the carry roller 23. The paper detection sensor 53 is for detecting the position of the front end of the paper that is being supplied. The optical sensor 54 detects whether or not the paper is present by a light-emitting section and a light-receiving section provided in the carriage 31. The optical sensor 54 can detect the width of the paper by detecting the position of the end of the paper while being moved by the carriage 31. Depending on the circumstances, the optical sensor 54 can also detect the front end of the paper (the downstream end in the carrying direction, also called the upper end) and the rear end of the paper (the upstream end in the carrying direction; also called the lower end).

The controller 60 is a control unit (controller) for carrying out control of the printer. The controller 60 has an interface section 61, a CPU 62, a memory 63, and a unit controlling circuit 64. The interface section 61 is for exchanging data between the computer 110, which is an external device, and the printer 1. The CPU 62 is a computational processing device for carrying out overall control of the printer. The memory 63 is for reserving a working region and a region for storing programs for the CPU 62, for instance, and includes storage means such as a RAM or an EEPROM. The CPU 62 controls the various units via the unit controlling circuit 64 in accordance with programs stored in the memory 63.

Processing During Printing

Figure 4:
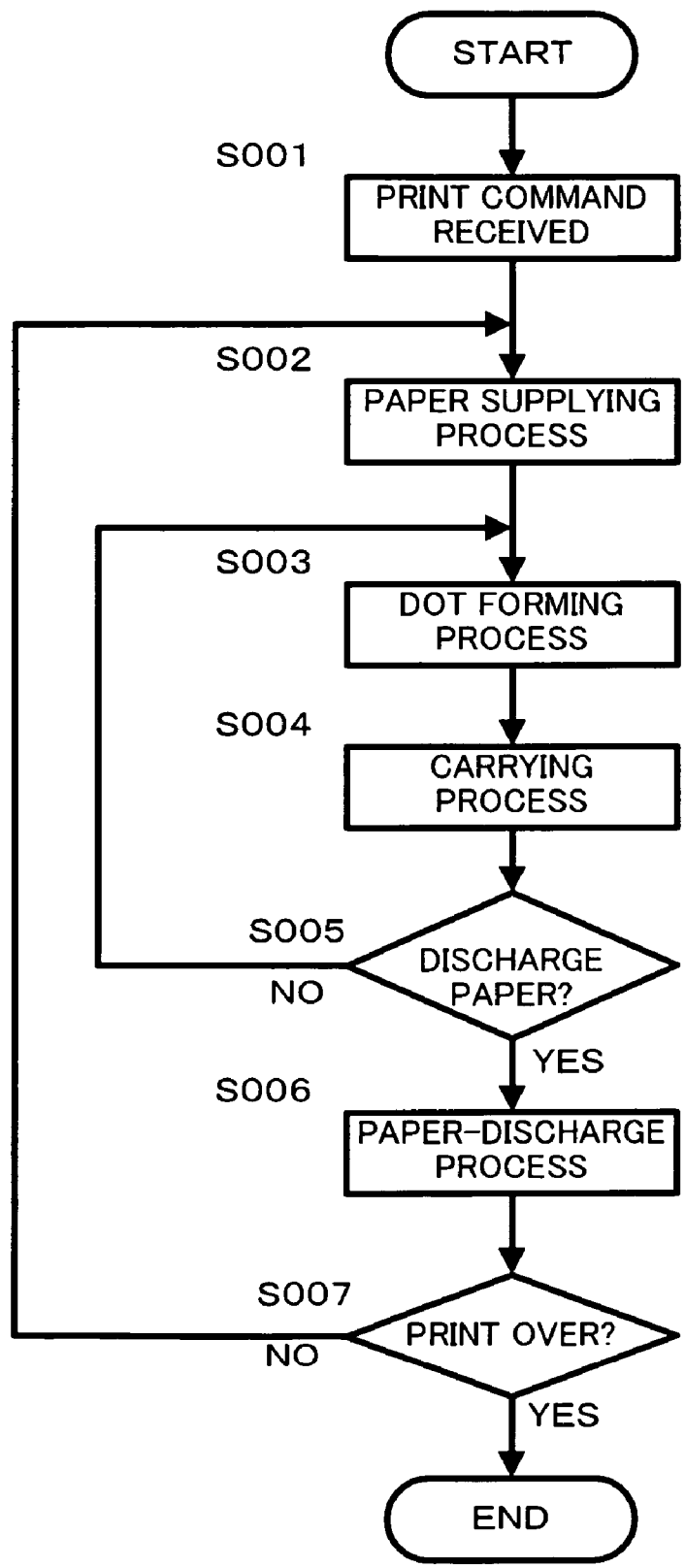
FIG. 4 is a flow chart showing processes during printing.

FIG. 4 is a flowchart of the processes during printing. The processes described below are executed by the controller 60 controlling the various units in accordance with a program stored in the memory 63. This program includes code for executing the various processes.

Receive Print Command (S001): First, the controller 60 receives a print command from the computer 110 via the interface section 61. This print command is included in the header of the print data transmitted from the computer 110. The controller 60 then analyzes the content of the various commands included in the print data that has been received, and uses the various units to perform the following paper supplying process, carrying process, and dot forming process, for example.

Paper supplying Process (S002): The paper supplying process is a process for supplying paper to be printed into the printer and positioning the paper at a print start position (also referred to as the "indexing position"). The controller 60 rotates the paper supply roller 21 to feed the paper to be printed up to the carry roller 23. Then, the controller 60 rotates the carry roller 23 to position the paper that has been fed from the paper supply roller 21 at the print start position. When the paper has been positioned at the print start position, at least some of the nozzles of the head 41 are in opposition to the paper.

Dot Forming Process (S003): The dot forming process is a process for intermittently ejecting ink from a head that moves in the moving direction so as to form dots on the paper. The controller 60 drives the carriage motor 32 to move the carriage 31 in the moving direction. The controller 60 then causes the head to eject ink in accordance with the print data while the carriage 31 is moving. Dots are formed on the paper when ink droplets ejected from the head 41 land on the paper. Since ink is intermittently ejected from the moving head 41, rows of dots (raster lines) made of a plurality of dots in the moving direction are formed on the paper.

Carrying Process (S004): The carrying process is a process for moving the paper relative to the head in the carrying direction. The controller 60 drives the carrying motor to rotate the carry roller and carries the paper in the carrying direction. Through this carrying process, the head 41 can form dots at positions that are different than the positions of the dots formed in the preceding dot forming process.

Paper Discharge Determination (S005): The controller 60 determines whether or not to discharge the paper being printed. The paper is not discharged if there are still data to print to the paper being printed. The controller 60 alternately repeats the dot forming and carrying processes until there is no longer data to be printed, thus gradually printing an image made of dots on the paper.

Paper Discharge Process (S006): When there is no longer data to print to the paper being printed, the controller 60 discharges that paper by rotating the paper-discharge roller. It should be noted that whether or not to discharge the paper can also be determined based on a paper discharge command included in the print data.

Print Over Determination (S007): Next, the controller 60 determines whether or not to continue printing. If the next sheet of paper is to be printed, then printing is continued, and the paper feeding process for the next sheet of paper is started. If no further sheet of paper is to be printed, then the printing operation is terminated.

Configuration of the Head 41

Regarding the Arrangement of the Nozzles

Figure 5:
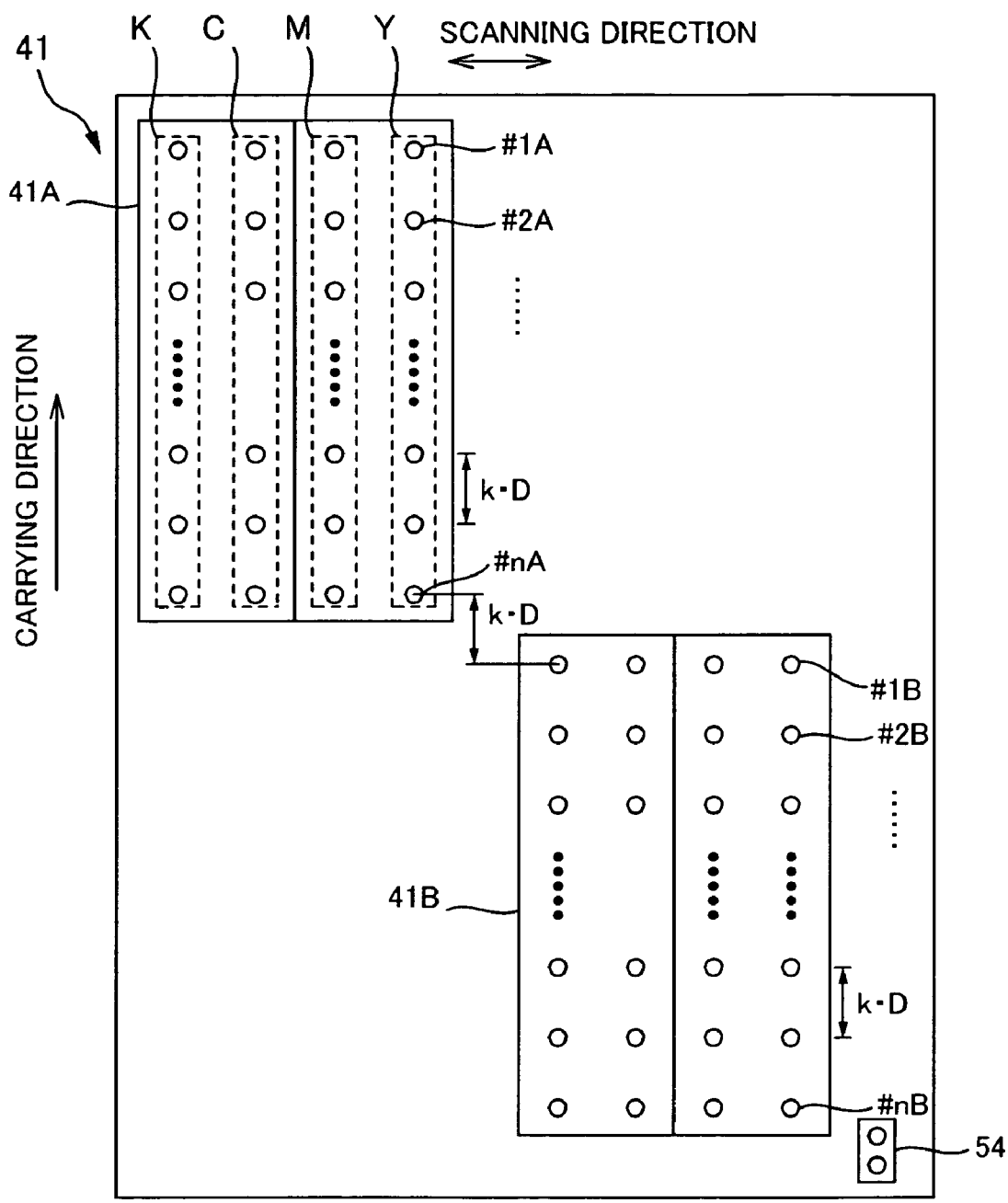
FIG. 5 is an explanatory diagram showing an arrangement of nozzles.

FIG. 5 is an explanatory diagram showing the arrangement of the nozzles. A plurality of nozzle groups (a first nozzle group 41A and a second nozzle group 41B) are provided on the lower surface of the head 41. Each nozzle group includes a black ink nozzle row K, a cyan ink nozzle row C, a magenta ink nozzle row M, and a yellow ink nozzle row Y. Each nozzle row is provided with a plurality of nozzles (in this embodiment, n), which are ejection openings for ejecting inks of various colors.

The plurality of nozzles of the nozzle rows are each arranged in a row at a constant spacing (nozzle pitch: k·D) of $^1/_{180}$ inch in the carrying direction. Here, D is the minimum dot pitch in the carrying direction (that is, the spacing at the maximum resolution of dots formed on the paper S). For example, if the dot pitch is 720 dpi, K=4.

The nozzles of each nozzle row are assigned a number (#1 to #n) that becomes smaller the further downstream the nozzle is. The optical sensor 54 is provided slightly upstream of the nozzle #n that is on the upstream side of the furthest upstream nozzle group, with respect to the carrying direction. Each nozzle is provided with a piezo element (not shown) as a drive element for driving each nozzle and letting it eject ink droplets.

The first nozzle group 41A is provided on the further downstream side in the carrying direction of the second nozzle group 41B. The interval in the carrying direction between the nozzle #nA that is located on the furthest upstream side in the carrying direction of the first nozzle group 41A and the nozzle #1B that is located on the furthest downstream side in the carrying direction of the second nozzle group 41B is $^1/_{180}$ inch. However, the second nozzle group 41B is provided shifted in the carriage moving direction (scanning direction) with respect to the first nozzle group 41A.

Note that, in FIG. 5, although the head 41 has two nozzle groups, any number of nozzle groups can be provided as long as it is plural, and the nozzle group number is not limited to two.

Regarding the Configuration in the Vicinity of the Nozzle Group

Figure 6:
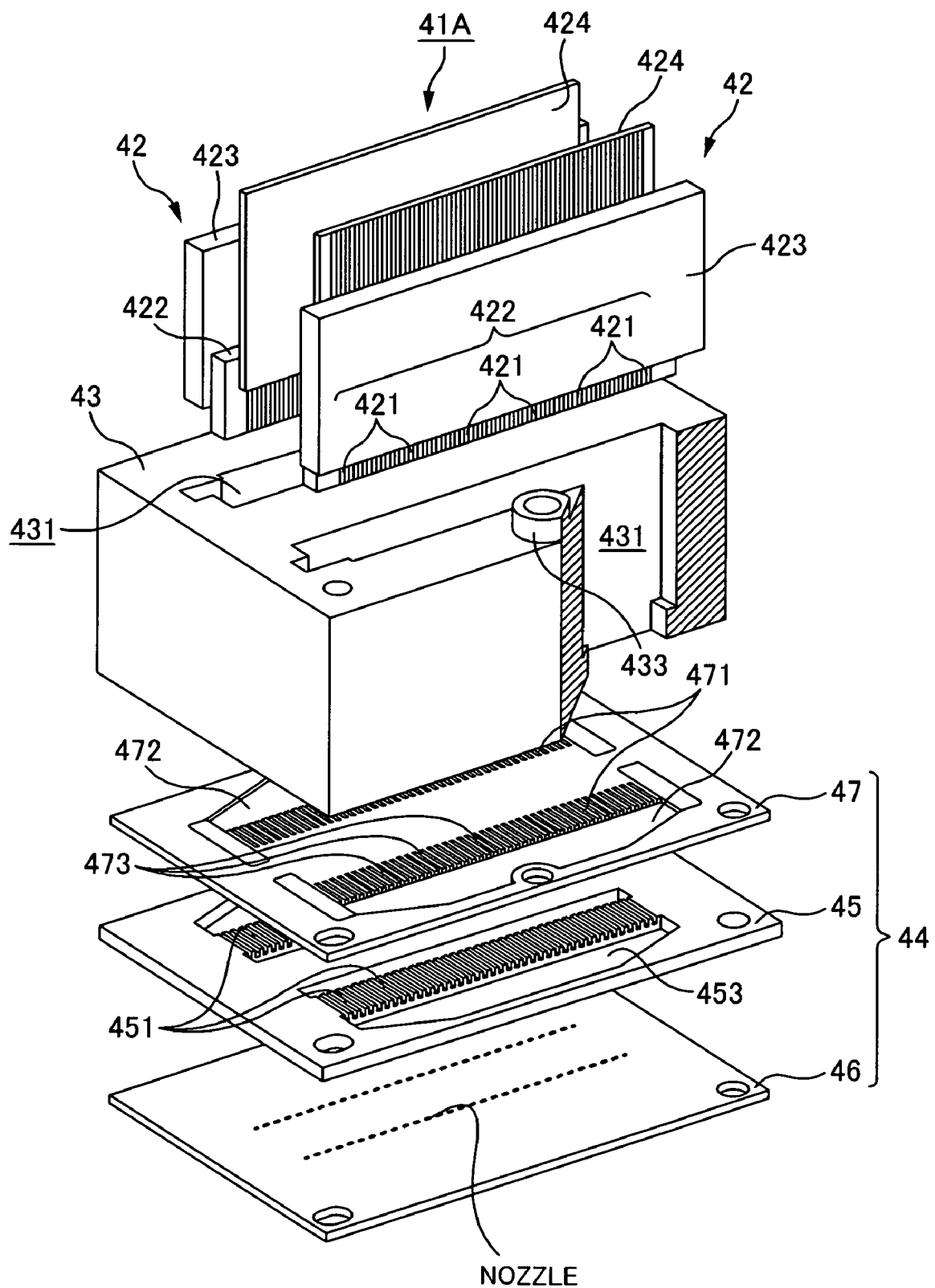
FIG. 6 is an explanatory diagram showing the configuration of a first nozzle group 41A and the vicinity thereof.
Figure 7:
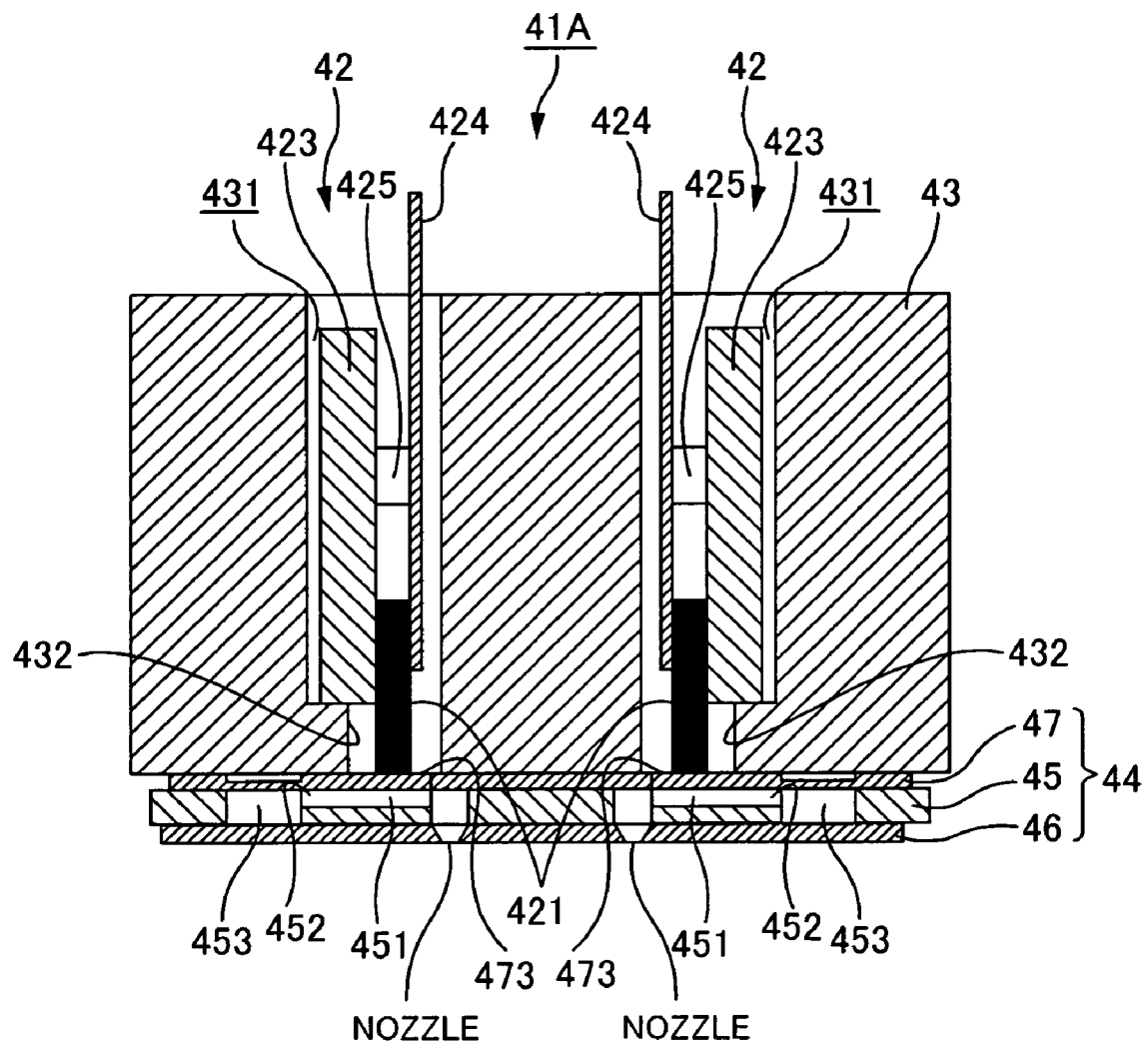
FIG. 7 is a cross-sectional view of the first nozzle group 41A and the vicinity thereof.

FIG. 6 is an explanatory diagram of the configuration of the first nozzle group 41A and the vicinity thereof. FIG. 7 is a cross-sectional view of the first nozzle group 41A and the vicinity thereof. In order to simplify explanation, the configuration of two nozzle rows of the first nozzle group 41A and the vicinity thereof is described.

In the vicinity of the first nozzle group 41A, a plurality of drive units 42 provided respectively corresponding to the nozzle rows, a case 43 capable of accommodating the drive units 42, and a flow channel unit 44 attached to the case 43 are provided.

The drive unit 42 is configured by a piezo element group 422 made up of a plurality of piezo elements 421, a fixing plate 423 onto which the piezo element group 422 is fixed, and a flexible cable 424 for supplying power to each piezo element 421. Each piezo element 421 fixes its fixing end portion onto the fixing plate 423, protruding its free end portion from the front end surface of the fixing plate 423. Specifically, each piezo element 421 is attached to the fixing plate 423 in a state of what is called cantilever. The fixing plate 423 is a plate-like member having stiffness higher than that of the resin constituting the case 43, in other words, having enough stiffness to endure the reaction force from the piezo element 421. Metal plates with good heat radiation, for example, stainless steel plate is preferably used for the fixing plate 423. The flexible cable 424 is a sheet-like circuit board having flexibility and is electrically connected to the piezo elements 421 on a side face of the fixing end portion that is on the side opposite to the fixing plate 423. On the surface of the flexible cable 424, a control IC 425 (control chip, see FIG. 7) for controlling drive or the like of the piezo elements 421 is mounted.

The case 43 has a rectangular block external shape including an accommodation space 431 which can accommodate the drive unit 42, and is made of epoxy resin, which is one type of thermosetting resin. This is because the thermosetting resins such as epoxy resin has higher mechanical strength than general resins, and therefore can sufficiently endure vibrations from the piezo elements 421. Furthermore, since the linear expansion coefficient of this type of thermosetting resin is smaller than that of general resins, deformation due to temperature change in the surroundings can be suppressed.

The above-described flow channel unit 44 is joined to the front end surface of the case 43, and the surface on the opposite side to this front end surface serves as an attachment surface to be attached to the carriage (not shown). The accommodation space 431 is formed by penetrating the case 43 in the height direction of the case 43 from the attachment surface through the front end surface. The accommodation space 431 is an oblong hollow space when viewed from the top, and is of a size that the drive unit 42 can just fit. On the front end portion of the accommodation space 431, as shown in FIG. 7, a stepped projection 432 is formed, to the surface of which the front end surface of the fixing plate 423 is bonded.

An ink supply tube 433 for introducing ink from an ink cartridge (not shown) to the flow channel unit 44 is also formed in the case 43. The ink supply tube 433 is formed by penetrating the case 43 in the height direction of the case 43 in the vicinity of the accommodation space 431.

The flow channel unit 44 has a flow channel forming substrate 45, a nozzle plate 46 and an elastic plate 47, which are respectively laminated and integrally structured with the flow channel forming substrate 45 being sandwiched by the nozzle plate 46 and the elastic plate 47. The nozzle plate 46 is a thin stainless steel plate on which nozzle rows shown in FIG. 5 are formed.

The flow channel forming substrate 45 is a plate-like member, on which a plurality of hollow sections that become a pressure compartment 451 and an ink supply port 452 (see FIG. 7) are formed corresponding to each nozzle, and a hollow section that becomes a reservoir 453 is formed corresponding to each nozzle row. The flow channel forming substrate 45 is manufactured by subjecting a silicon wafer to an etching process. The pressure compartment 451 is a compartment long in a direction perpendicular to the nozzle row direction (i.e., carriage moving direction), and composed of a flat concave compartment divided by blocking sections. By the blocking section, the ink supply port 452 is formed as a narrowed section with a narrow flow channel width. The reservoir 453 is a liquid storing compartment for supplying the ink stored in the ink cartridge to each pressure compartment 451, and is communicated to the other end of the corresponding pressure compartment 451 via the ink supply port 452. Further, the ink supply tube 433 is communicated to the reservoir 453. Then the ink from the ink cartridge is introduced to the reservoir 453 through the ink supply tube 433.

The elastic plate 47 is a double-structured composite plate member that is manufactured by laminating an elastic film on a metal supporting plate such as stainless steel, and includes a diaphragm section 471 that seals one of the opening surfaces of the hollow section that becomes the pressure compartment 451. Further, the elastic plate 47 is also provided with a compliance section 472 that seals one of the opening surfaces of the hollow section that becomes the reservoir 453. Note that, the elastic film is made of a PPS (polyphenylene sulphide) resin film. In the elastic plate 47, with respect to the portion that becomes the diaphragm 471, that is, the portion corresponding to the pressure compartment 451, the corresponding portion on the supporting plate is subjected to the etching process to remove the supporting plate leaving an island section 473. The front edge of the free end portion of the piezo element 421 is bonded to the island section 473. Further, with respect to a part that becomes a compliance section 472, that is, the part corresponding to the reservoir 453, the corresponding portion on the supporting plate is subjected to an etching process and removed, leaving only the elastic film.

Then, as shown in FIG. 7, the drive unit 42 is inserted to the accommodation space 431 with the free end portion of the piezo element 421 facing the flow channel unit 44, and the front end surface of this free end portion is bonded to the corresponding island section 473. The rear surface of the fixing plate that is on the side opposite to the piezo element group joining surface is bonded to the interior wall of the case 43 that defines the accommodation space 431. In a state in which the drive unit 42 is accommodated, when a drive signal is supplied via the flexible cable 424, the piezo element 421 expands or constricts and varies the capacity of the pressure compartment 451. For example, when the piezo element 421 constricts in a longitudinal direction of the oscillator, the island section 473 is pulled toward the drive unit side with this constriction, and expands the pressure compartment 451. On the other hand, when the piezo element 421 elongates in the longitudinal direction of the oscillator, the island section 473 is pushed toward the pressure compartment side due to this elongation, so that the pressure compartment 451 constricts. Due to such variance of the capacity of the pressure compartment 451, pressure variance occurs to the ink in the pressure compartment 451. That is, ink is pressurized due to constriction of the pressure compartment 451, and ink is depressurized due to expansion of the pressure compartment 451. In this way, an ink droplet can be ejected from a nozzle utilizing this variance in ink pressure.

The configuration of the second nozzle group 41B and the vicinity thereof is the same as that of the first nozzle group 41A and the vicinity thereof, and therefore description is omitted. However, it should be noted that components of the second nozzle group 41B and the vicinity thereof are provided separately from those of the first nozzle group 41A and the vicinity thereof. For example, the drive unit 42 provided corresponding to the second nozzle group 41B is provided separately from the drive unit 42 provided corresponding to the first nozzle group 41A.

PRINTING METHOD AS REFERENCE EXAMPLE (ONE NOZZLE GROUP)

In the present embodiment, the head 41 has a plurality of nozzle groups. Therefore, in the present embodiment, a plurality of nozzle groups are used to perform printing, however, in order to understand the printing method of the present embodiment, "interlace printing", "overlap printing", "partial overlap printing" and "non-uniform overlap printing" using one nozzle group are described first as reference examples.

Reference Example

Interlace Printing

Figure 8A:
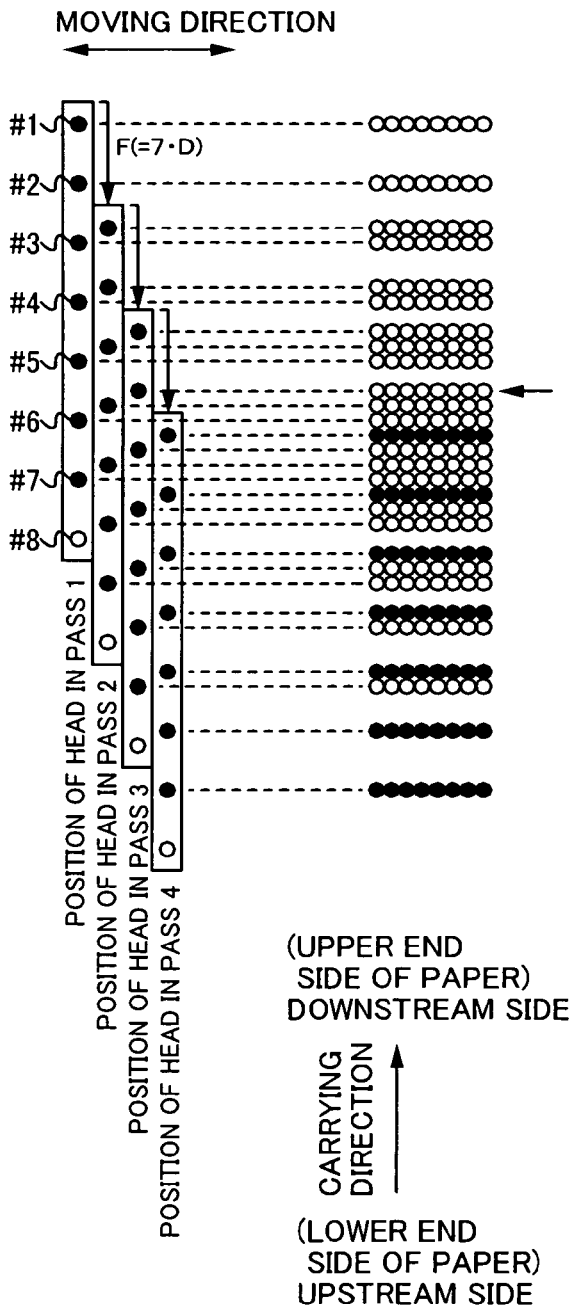
FIG. 8A and FIG. 8B are explanatory diagrams of interlace printing.
Figure 8B:
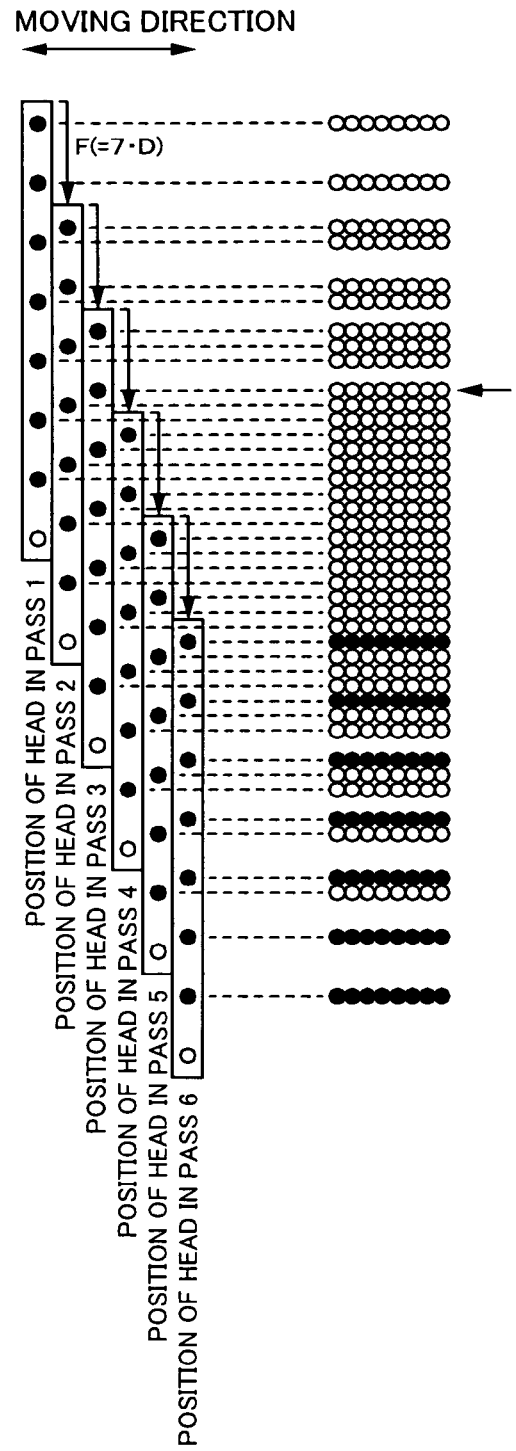

FIGS. 8A and 8B are explanatory diagrams of the interlace printing. FIG. 8A shows the position of the nozzle group in passes 1 to 4 and how the dots are formed, and FIG. 8B shows the position of the nozzle group in passes 1 to 6 and how the dots are formed.

For the convenience of explanation, only one nozzle row of the four nozzle rows of one nozzle group is shown, and the number of nozzles of the nozzle row is reduced (to eight nozzles in this case.) Moreover, in this diagram, nozzles shown by solid circles are the nozzles that can eject ink. On the other hand, nozzles shown by open circles are nozzles that do not eject ink. Further, for the convenience of explanation, the nozzle group is illustrated as if moving with respect to the paper, but the drawing shows the relative position of the nozzle group and the paper, and in fact the paper is moving in the carrying direction. Further, for the convenience of explanation, the nozzles are shown forming only a few dots (circles in the drawing), but in actuality a large number of dots are lined up in the moving direction because ink droplets are ejected intermittently from the nozzles which move in the moving direction. These rows of dots are also called "raster lines". Dots indicated by solid circles are dots formed in the last pass, while dots indicated by open circles are dots formed in the previous passes. Note that, a "pass" is the process for forming dots by ejecting ink from moving nozzles (a dot forming process). Passes are performed in alternation with a process for carrying the paper in the carrying direction (a carrying process). An nth pass is called as "pass N", for example.

Here, "interlace printing" refers to a printing method in which k is at least 2 and raster lines that are not recorded is sandwiched between the raster lines that are recorded in a single pass. For example, in the printing method shown in FIGS. 8A and 8B, three raster lines are sandwiched between raster lines formed by a single pass.

In the interlace printing, every time the paper is carried in the carrying direction by a constant carrying amount F, the nozzles record a raster line adjacent to a raster line that was recorded in the immediately prior pass. In order to carry out recording in this manner with a constant carrying amount, it is necessary to satisfy the conditions that, (1) the number N (integer) of nozzles that can eject ink is coprime to k, and (2) the carrying amount F is set to N·D.

In the figure, the nozzle row has eight nozzles arranged in the carrying direction. Since the nozzle pitch K of the nozzle row is 4, in order to satisfy the condition to perform interlace printing, "N is coprime to K", not all the nozzles are used, and seven nozzles (nozzle #1 to nozzle #7) are used. Furthermore, because seven nozzles are used, the paper is carried using a carrying amount of 7·D. As a result, using a nozzle row with a nozzle pitch of 180 dpi (4·D) for example, dots are formed on the paper with a dot spacing of 720 dpi (=D). It should be noted that the actual number of nozzles is greater than seven, so that the actual carrying amount is larger than 7·D.

In case of the interlace printing, k passes are required to complete successive raster lines in the width of the nozzle pitch. For example, in order to complete four successive raster lines at the dot spacing of 720 dpi using a nozzle row whose nozzle pitch is 180 dpi, four passes are required. In FIGS. 8A and 8B, it is shown that successive raster lines are formed with the dot spacing D in the carrying direction upstream side from the raster line formed by the nozzle #2 in pass 3 (the raster line indicated by the arrow in the figures).

Reference Example

Full Overlap Printing

Figures 9A, 9B:
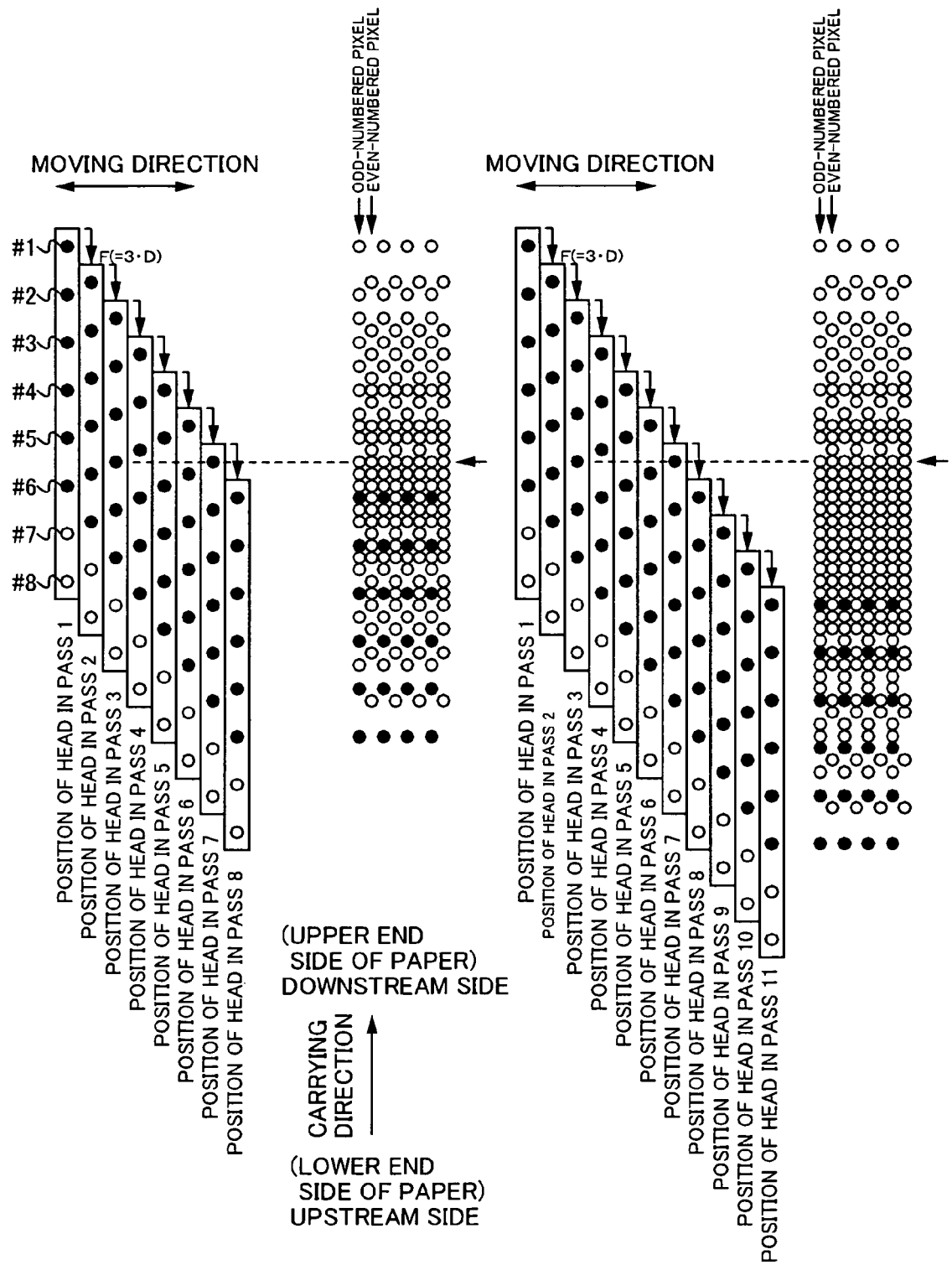
FIG. 9A and FIG. 9B are explanatory diagrams of full overlap printing.

FIGS. 9A and 9B are explanatory diagrams of the full overlap printing. FIG. 9A shows the positions of the head and how dots are formed in passes 1 to 8. FIG. 9B shows the positions of the head and how dots are formed in passes 1 to 11.

"Full overlap printing" means a printing method by which a raster line is formed by a plurality of nozzles. For example, in the printing method shown in FIGS. 9A and 9B, each raster line is formed by two nozzles.

In the full overlap printing, each time the paper is carried by a constant carrying amount F in the carrying direction, the nozzles form dots intermittently at every several dots. Then, by letting another nozzle form dots in another pass to complement the intermittent dots that have already been formed (to fill in a space between dots), a single raster line is formed by a plurality of nozzles. "Overlap number M" is defined as the number of passes m required to form a single raster line.

In FIGS. 9A and 9B, since each nozzle forms dots intermittently at every other dot, dots are formed in every pass either at the odd-numbered pixels or at the even-numbered pixels. Since a single raster line is formed by two nozzles, the overlap number M is 2.

In the overlap printing, conditions to carry out recording with a constant carrying amount are: (1) N/M is an integer, (2) N/M and k are coprime, and (3) the carrying amount F is set to (N/M)·D.

In FIGS. 9A and 9B, each nozzle row has eight nozzles arranged in the carrying direction. However, since the nozzle pitch k of the nozzle row is 4, in order to fulfill the condition for performing the overlap printing, "N/M and k are coprime", not all the nozzles can be used. Therefore, six of the eight nozzles are used to perform overlap printing. Furthermore, because six nozzles are used, the paper is carried using a carrying amount of 3·D. As a result, using a nozzle row with a nozzle pitch of 180 dpi (4·D) for example, dots are formed on the paper with a dot spacing of 720 dpi (=D).

When a single raster line is formed by M nozzles, k×M passes are required in order to complete the number of raster lines corresponding to the nozzle pitch. For example, in FIGS. 9A and 9B, a single raster line is formed by two nozzles, so that eight passes are required to complete four raster lines. In FIGS. 9A and 9B, it is shown that successive raster lines are formed with the dot spacing D in the carrying direction upstream side from the raster line formed by the nozzle #4 in pass 3 and the nozzle #1 in pass 7 (the raster line indicated by the arrow in the figures.)

In FIGS. 9A and 9B, each nozzle forms dots at the odd-numbered pixels in pass 1, each nozzle forms dots at the even-numbered pixels in pass 2, each nozzle forms dots at the odd-numbered pixels in pass 3, and each nozzle forms dots at the even-numbered pixels in pass 4. In other words, in the four passes during the first half, dots are formed in the order of odd-numbered pixels, even-numbered pixels, odd-numbered pixels, even-numbered pixels. Then, in the four passes during the second half (from pass 5 through pass 8), dots are formed in reverse order with respect to the four passes during the first half, namely, in the order of even-numbered pixels, odd-numbered pixels, even-numbered pixels, odd-numbered pixels. Note that, the dot formation order in or after pass 9 is the same as the dot formation order from pass 1.

Reference Example

Partial Overlap Printing

Figure 10A:
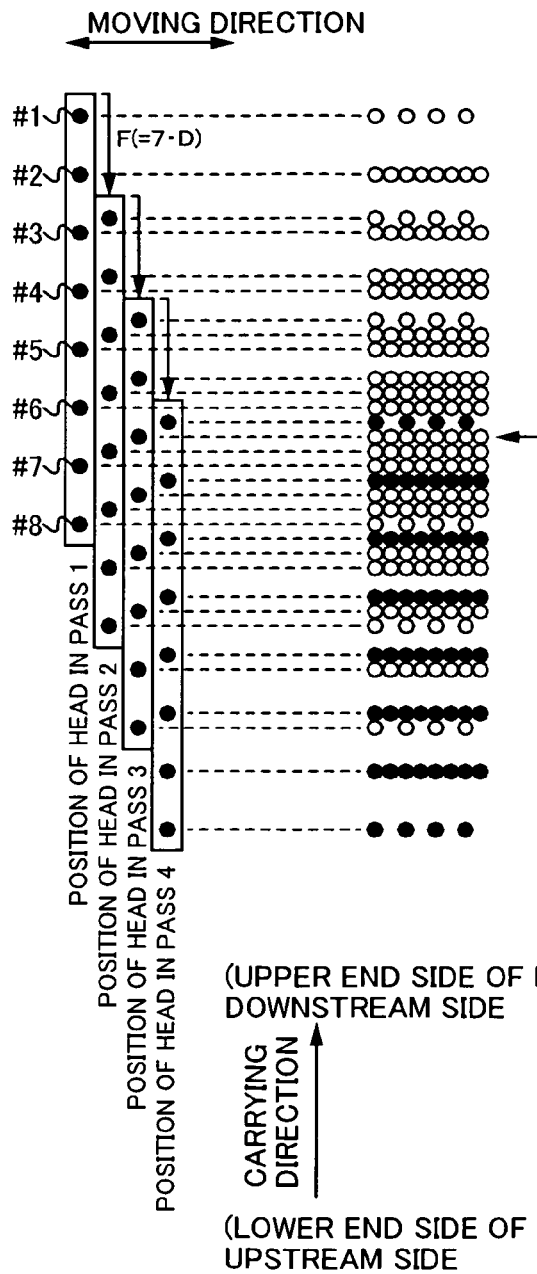
FIG. 10A and FIG. 10B are explanatory diagrams of partial overlap printing.
Figure 10B:
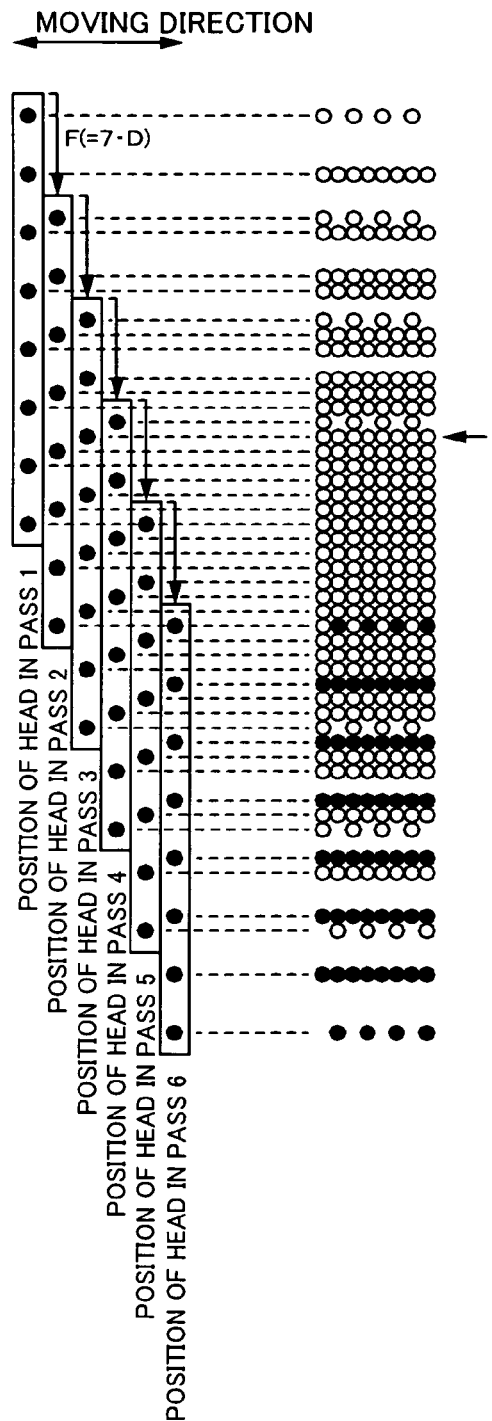

FIGS. 10A and 10B are explanatory diagrams of the partial overlap printing. FIG. 10A shows the positions of the head and how dots are formed in passes 1 to 4, and FIG. 10B shows the positions of the head and how dots are formed in passes 1 to 6.

In the partial overlap printing, compared with the interlace printing (see FIGS. 8A and 8B), the number of usable nozzles is set in a redundant manner. Due to this redundancy in the nozzles, the number of dots formed by a part of the nozzles is reduced to half of that formed by an ordinary nozzle. In the following description, a nozzle for which the number of dots formed by that nozzle is reduced to half of that of the ordinary nozzle is called "POL nozzle".

In the partial overlap printing, two nozzles, a nozzle located at the end portion in the carrying direction upstream side of a nozzle group and a nozzle located at the end portion in the carrying direction downstream side of the nozzle group, perform the same function as a single nozzle located in the central portion of that nozzle group. For example, in FIGS. 10A and 10B, the nozzle #1 and the nozzle #8 form only a half number of dots compared with the nozzles #2 to #7. In short, the nozzle #1 and the nozzle #8 are POL nozzles. However, the number of nozzles that can eject ink in FIGS. 10A and 10B is greater compared with the number of nozzles that can eject ink in FIGS. 8A and 8B.

In the partial overlap printing, a POL nozzle located at the end portion in the carrying direction upstream side intermittently forms dots. Then, the POL nozzle located at the end portion in the carrying direction downstream side forms dots in another pass so as to complement the intermittent dots that have already been formed (so as to fill in a space between dots). In this way, two POL nozzles located at the end portions perform the same function as one nozzle located in the central portion. For example, in FIGS. 10A and 10B, after the nozzle #8 forms dots intermittently at every other dot in a certain pass, the nozzle #1 forms dots to fill in the space between the above dots in another pass, and one raster line is completed.

In the partial overlap printing as well, as in the above-described interlace printing, a carry operation by a constant carrying amount F is carried out alternately with each pass. In order to carry out printing in this manner with a constant carrying amount, it is necessary, to satisfy the two conditions that (1) the total number N' of nozzles is coprime to k, and (2) the carrying amount F is set to N'·D. Here, "the total number of nozzle N'" is a total nozzle number obtained by counting a nozzle in the central portion as "1" and counting a POL nozzle that forms only a half number of dots as "0.5". For example, in FIGS. 10A and 10B, the total nozzle number N' is "7".

Reference Example

Non-Uniform Overlap Printing

In the above-described partial overlap printing, the number of usable nozzles is set in a more redundant manner than in the foregoing interlace printing. However, it is possible to set the number of usable nozzles in a more redundant manner in respect to the foregoing full overlap printing.

Figures 11A, 11B:
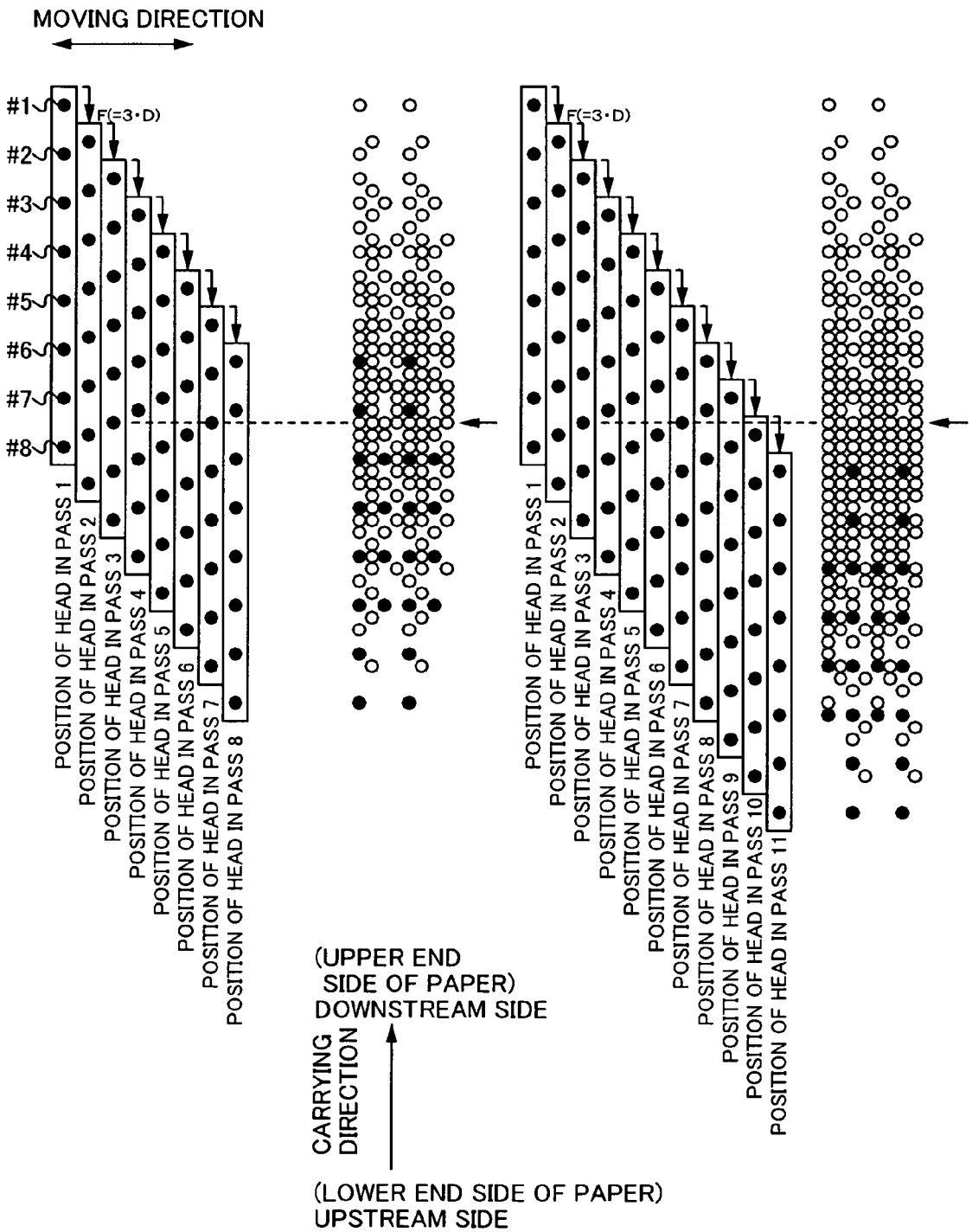
FIG. 11A and FIG. 11B are explanatory diagrams of non-uniform overlap printing.

FIGS. 11A and 11B are explanatory diagrams of the non-uniform overlap printing. FIG. 11A shows the positions of the head and how dots are formed in passes 1 to 8, and FIG. 11B shows the positions of the head and how dots are formed in passes 1 to 11.

In this case, the nozzles #3 to #6 located in the central portion of the nozzle group form dots as in the case of the above-described full overlap printing. On the other hand, nozzles located at the end portions of the nozzle group (nozzles #1, #2, #7 and #8) form only a half number of dots formed by the nozzles located in the central portion. That is, in this case, the nozzles #1, #2, #7 and #8 are POL nozzles. In addition, unlike the case of the above-described full overlap printing, all nozzles (nozzles #1 to #8) eject ink.

In order to carry out the partial overlap printing in the full overlap printing, it is necessary to satisfy the three conditions that (1) the number N'/M is an integer, (2) N'/M is coprime to k, and (3) the carrying amount F is set to (N'/M)·D. Note that, in FIGS. 11A and 11B, the total nozzle number N' is "6".

Note that, in the foregoing full over printing, every raster line is formed by two nozzles. On the other hand, in this non-uniform overlap printing, some raster lines are formed by two nozzles, and others by three nozzles. In other words, in the non-uniform overlap printing, the number of nozzles that form raster lines is not uniform for each raster line.

Non-Uniform Overlap Printing by a Plurality of Nozzle Groups Reference Example

Figure 12:
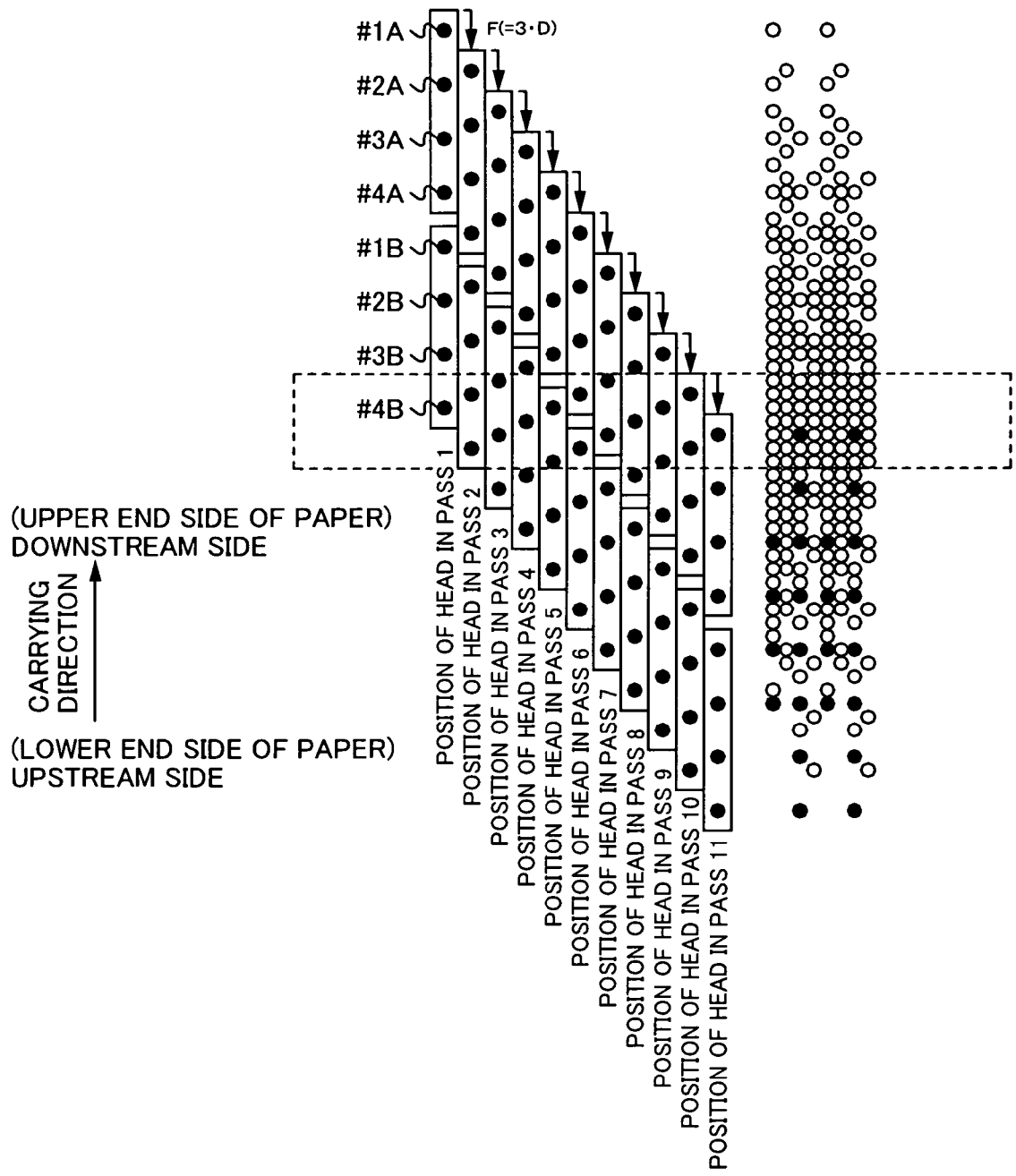
FIG. 12 is an explanatory diagram of the non-uniform overlap printing by a plurality of nozzle groups.

FIG. 12 is an explanatory diagram of the non-uniform overlap printing using a plurality of nozzle groups. It should be noted that this diagram is an explanatory diagram of a relative positional relationship between the nozzles and paper in the carrying direction. Therefore, two nozzle groups are shown simply lined up in the carrying direction, ignoring the positional difference in the moving direction (scanning direction) of the first nozzle group 41A and the second nozzle group 41B (FIG. 5).

In this example, two nozzle groups (the first nozzle group 41A and the second nozzle group 41B) are provided in the head 41, and each nozzle group includes nozzle rows each provided with four nozzles (here, to simplify the description, only one nozzle row is shown). Since the spacing between the nozzle #4A and the nozzle #1B is equal to the nozzle pitch, the total eight nozzles are lined up in the same manner as the eight nozzles in FIGS. 11A and 11B.

Accordingly, in this reference example, the nozzles #1A to #4A of the first nozzle group 41A form dots as similar to the nozzles #1 to #4 of FIGS. 11A and 11B. Also in this reference example, the nozzles #1B to #4B of the second nozzle group 41B form dots as similar to the nozzles #5 to #8 of FIGS. 11A and 11B. In addition, in this reference example, dots can be formed as in the case of FIG. 11B.

Figure 13:
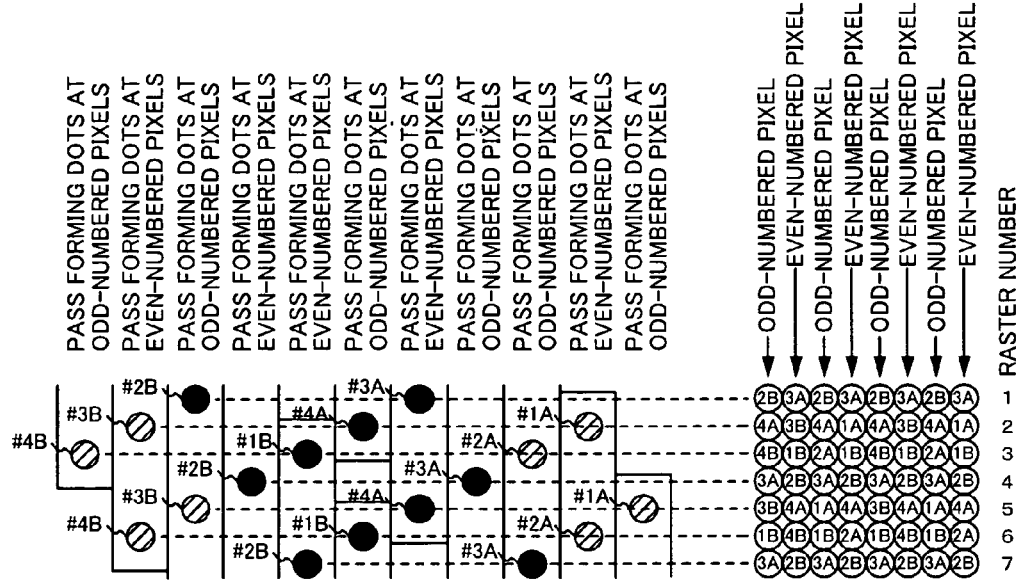
FIG. 13 is an explanatory diagram of how dots are formed in the region enclosed with the dotted line in FIG. 12.

FIG. 13 is an explanatory diagram of how dots are formed in the region enclosed with the dotted line in FIG. 12. Of the circles on the left side of the diagram that represent nozzles, the nozzles indicated by hatched circles represent POL nozzles, which forms a half number of dots formed by the nozzles indicated by solid circle. In each circle on the right side of the diagram that represents a dot, the nozzle number to form that dot is indicated.

In this non-uniform overlap printing, the first, fourth and seventh raster lines are formed by two nozzles. On the other hand, the second, third, fifth and sixth raster lines are formed by three nozzles. In this manner, in the non-uniform overlap printing, the number of nozzles that form raster lines is not uniform according to each raster line.

For example, the first, fourth and seventh raster lines are formed by the nozzles #2B and #3A. On the other hand, the second and fifth raster lines are formed by the nozzles #3B, #4A and #1A, with the nozzles #3B and #1A functioning as POL nozzles. Further, the third and sixth raster lines are formed by the nozzles #4B, #1B and #2A, with the nozzles #4B and #2A functioning as POL nozzles.

Problems in the Reference Example

Figure 14:
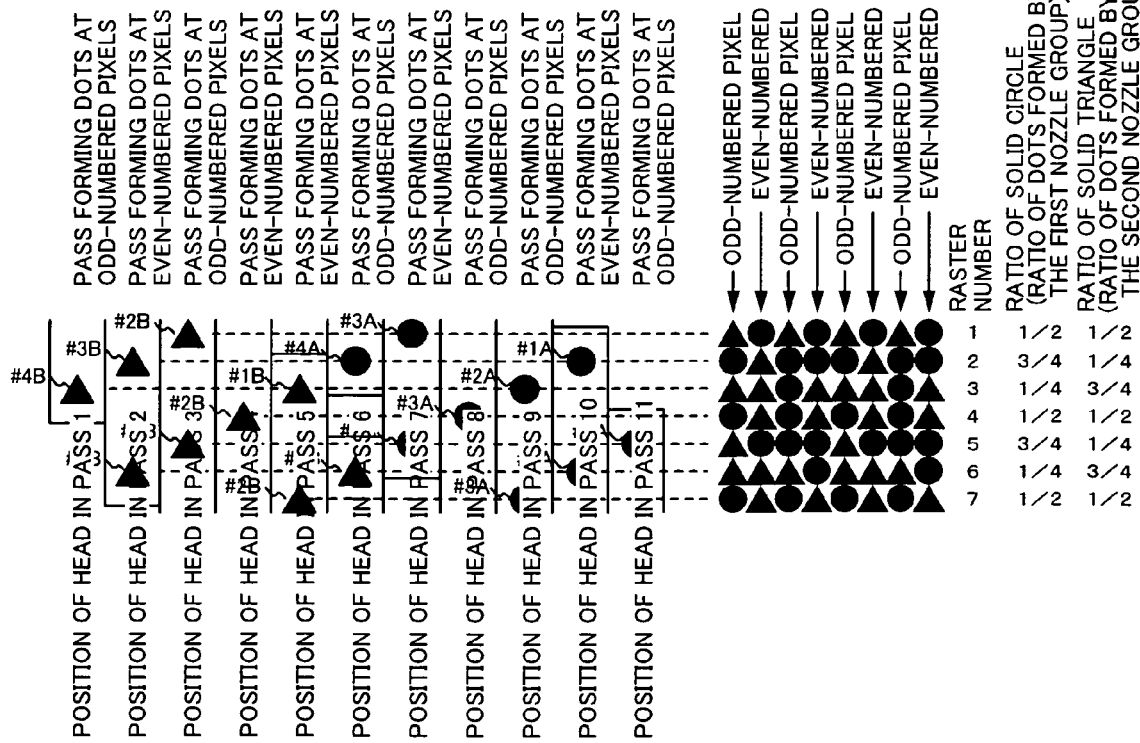
FIG. 14 is an explanatory diagram showing a problem in a reference example.

FIG. 14 is an explanatory diagram of problems in the reference examples. FIG. 14 is also, as FIG. 13, an explanatory diagram of how dots are formed in the region enclosed with the dotted line in FIG. 12. However, the representations in FIG. 14 are different to those in FIG. 13. That is, nozzles of the first nozzle group (nozzles #1A to #4A) are indicated by solid circles, and nozzles of the second nozzle group (nozzles #1B to #4B) are indicated by solid triangles. In addition, dots formed by the nozzles of the first nozzle group are also indicated by solid circles, and dots formed by the nozzles of the second nozzle group are also indicated by solid triangles.

Here, the number of the solid circles and the number of the solid triangles in each raster line are focused on. As described below, in the reference example, the ratio between the solid circle and the solid triangle differs in each raster line.

In the raster lines formed by two nozzles (the first, fourth and seventh raster lines), the number of the solid circles is equal to that of the solid triangles. In other words, in these raster lines, the number of dots formed by nozzles of the first nozzle group 41A (nozzle #3A) and the number of dots formed by the second nozzle group 41B (nozzle #2B) are equally ½.

Of the raster lines formed by three nozzles, in the second and fifth raster lines, the number of solid circles occupies three-fourths of the total, and the number of solid triangles occupies one-fourth of the total. That is to say, in the second and fifth raster lines, the number of dots formed by the nozzles of the first nozzle group 41A (nozzles #1A and #4A) is larger than that by the nozzle of the second nozzle group 41B (nozzle #3B). Therefore, the second and fifth raster lines tend to be affected by the first nozzle group 41A.

On the other hand, of the raster lines also formed by three nozzles, in the third and sixth raster lines, the number of solid circles occupies one-fourth of the total, and the number of solid triangles occupies three-fourths of the total. That is to say, in the third and fifth raster lines, the number of dots formed by the nozzle of the first nozzle group 41A (nozzle #2A) is smaller than that by the nozzles of the second nozzle group 41B (nozzles #1B and #4B). Therefore, the third and sixth raster lines tend to be affected by the second nozzle group 41B.

Incidentally, respective piezo elements corresponding to a plurality of nozzles of the same nozzle group are constituted by the same drive unit 42 (See FIG. 6). For example, four piezo elements corresponding to the nozzles #1A to #4A of the first nozzle group 41A is constituted by the same drive unit 42. Therefore, the ink ejection characteristics of the nozzles of the same nozzle group have much in common.

On the other hand, piezo elements of different nozzle groups are respectively configured by separate drive units 42. For example, the piezo elements of the first nozzle group 41A are configured separately from the piezo elements of the second nozzle group 41B. Consequently, the first nozzle group 41A and the second nozzle group 41B tend to have different ink ejection characteristics. For this reason, dots formed by the first nozzle group 41A may be different from dots formed by the second nozzle group 41B, as affected by the ink ejection characteristics of the nozzle groups. For example, the size of the dot formed by the first nozzle group 41A may be smaller than the dots formed by the second nozzle group 41B.

In the reference example, since the ratio between the solid circle and the solid triangle is different in each raster line, each raster line is affected by the respective nozzle groups to a different degree. As a result, if the size of the dot formed by the first nozzle group becomes comparatively small due to influence of the ink ejection characteristic of each nozzle group, the second and fifth raster lines that is strongly affected by the first nozzle group 41A are formed more lightly than in other raster lines. Since a printed image is configured of a plurality of raster lines lined up in the carrying direction, if the density of the respective raster lines becomes inconsistent, a striped pattern appears in the printed image, which causes deterioration of the image quality of the printed image.

Consequently, in the present embodiment, each raster line is made to be affected by the respective nozzle groups to the same degree.

First Embodiment

Figure 15:
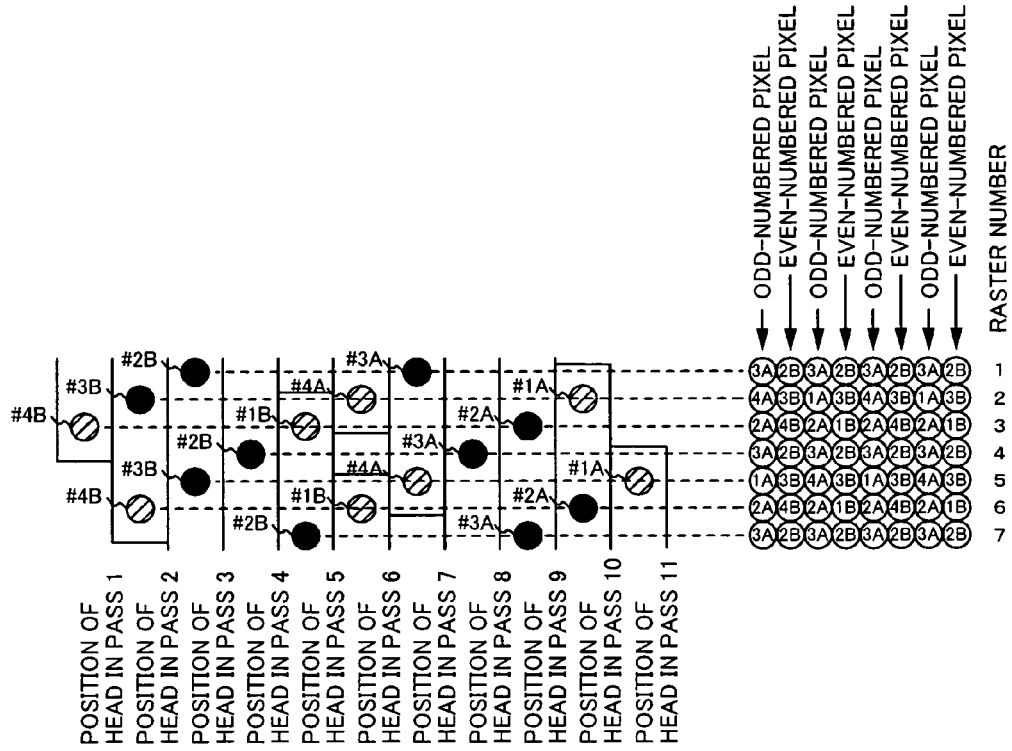
FIG. 15 is an explanatory diagram of how dots are formed by a first embodiment.
Figure 16:
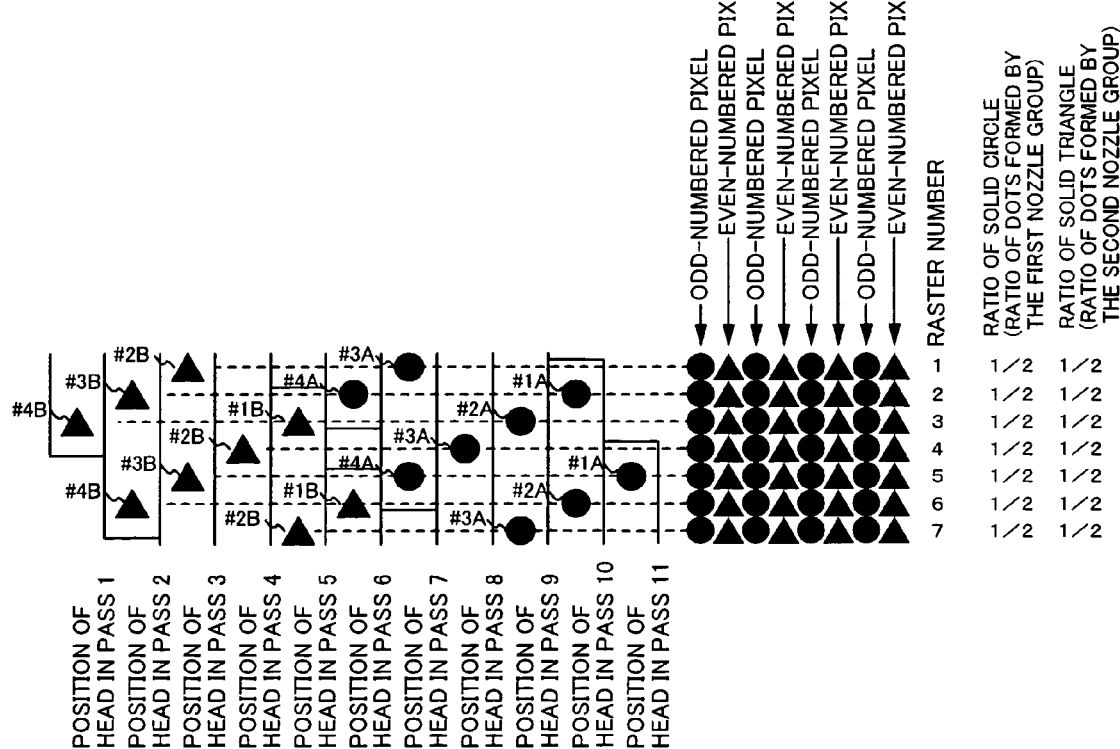
FIG. 16 is an explanatory diagram of how dots are formed by the first embodiment in the same manner as FIG. 14.

FIG. 15 is an explanatory diagram of how dots are formed in the first embodiment. FIG. 16 is an explanatory diagram of how dots are formed in the first embodiment represented in the same manner as FIG. 14.

Here, it should be noted that the POL nozzle of this first embodiment is different from the POL nozzle of the reference example.

The second and fifth raster lines are formed by three nozzles (nozzles #1A, #4A, and #3B). In other words, these raster lines are formed by two nozzles of the first nozzle group 41A (nozzles #1A and #4A) and one nozzle of the second nozzle group 41B (nozzle #3B). In this case, nozzles of the first nozzle group, which are larger in number in forming these raster lines, become POL nozzles. As a result, in the second and fifth raster lines, the number of dots formed by the nozzles of the first nozzle group 41A (nozzles #1A and #4A) and the number of dots formed by the nozzle of the second nozzle group 41B (nozzle #3B) is equally ½.

The third and sixth raster lines are also formed by three nozzles (nozzles #2A, #1B and #4B). However, unlike the second and fifth raster lines, these raster lines are formed by one nozzle of the first nozzle group 41A (nozzle #2A) and two nozzles of the second nozzle group 41B (nozzles #1B and #4B). In this case, nozzles of the second nozzle group, which are larger in number in forming these raster lines, become POL nozzles. As a result, in the third and sixth raster lines, the number of dots formed by the nozzles of the first nozzle group 41A and the number of dots formed by the nozzles of the second nozzle group 41B is equally ½.

By forming each raster line in this way, the number of dots formed by the nozzles of the first nozzle group 41A and the number of dots formed by the nozzles of the second nozzle group 41B is equally ½ in every raster line. Therefore, all raster lines are affected by the nozzle groups to the same degree.

Accordingly, if the size of the dot of the first nozzle group becomes smaller due to influence of the ink ejection characteristic of each nozzle group, since all raster lines are formed lightly to the same extent, no inconsistency occurs to the density of the raster lines. For this reason, it is possible to make the image quality of the printed image uniform without being affected by the ink ejection characteristic of each nozzle group.

In addition, in the present embodiment, nozzles of the first nozzle group form dots at the odd-numbered pixels, and nozzles of the second nozzle group form dots at the even-numbered pixels. Consequently, every raster line has the same dot arrangement, and the image quality of the printed image can be further made uniform. (On the other hand, in the reference example, the dot arrangement of the first raster line differs from the dot arrangement of the fourth and seventh raster lines (see FIG. 14)).

Incidentally, when configuring a plurality of piezo elements, the characteristic of a piezo element located at the end portion tends to be different from the characteristic of a piezo element located in the central portion that is interposed between adjacent piezo elements. For this reason, nozzles located at the end portions in the carrying direction in the nozzle groups tend to have ejection troubles. For example, the nozzles #1A and #4A located at the ends of the first nozzle group 41A tend to have ejection troubles, and further the nozzles #1B and #4B located at the ends of the second nozzle group 41B tend to have ejection troubles. When the ratio of dots formed by the nozzles with ejection trouble is large, the image quality is significantly deteriorated.

In the present embodiment, nozzles located at the end portions in the carrying direction of the nozzle groups function as POL nozzles. That is, in the first nozzle group 41A, the nozzle #1A located in the furthest downstream side in the carrying direction and the nozzle #4A located in the furthest upstream side in the carrying direction are the POL nozzles, and in the second nozzle group 41B, the nozzle #1B located in the furthest downstream side in the carrying direction and the nozzle #4B located in the furthest upstream side in the carrying direction are the POL nozzles. As a result, even if one of the two nozzles located at the end portions in the carrying direction has an ejection trouble, since these nozzles are the POL nozzles that form a small number of dots, the effect to the image quality is small.

For example, if the nozzles #1A and #4A located at the ends of the first nozzle group 41A in the reference example (see FIG. 13) have an ejection trouble, three-fourths of the dots constituting the second and fifth raster lines become defective dots. On the other hand, in the first embodiment (see FIG. 15), if the nozzles #1A and #4A have an ejection trouble, only half of the dots constituting the second and the fifth raster lines become defective dots. For this reason, when there is any nozzle with an ejection trouble, the image quality deteriorates less in the present embodiment than in the reference example.

Second Embodiment

When printing described above is performed from the beginning, a part of the raster lines may not be formed successively. For example, in FIG. 12, raster lines located in the upper end side of the paper than the region enclosed with the dotted line (upper side in FIG. 12) are not formed successively in the carrying direction (it should be noted that although the raster lines located at the lower end side of the paper than the region enclosed with the dotted line in FIG. 12 are also not formed successively, these raster lines are formed in or after pass 12.) Then, a printer forms successive raster lines in the carrying direction by performing "upper end printing" as described below.

Figure 17:
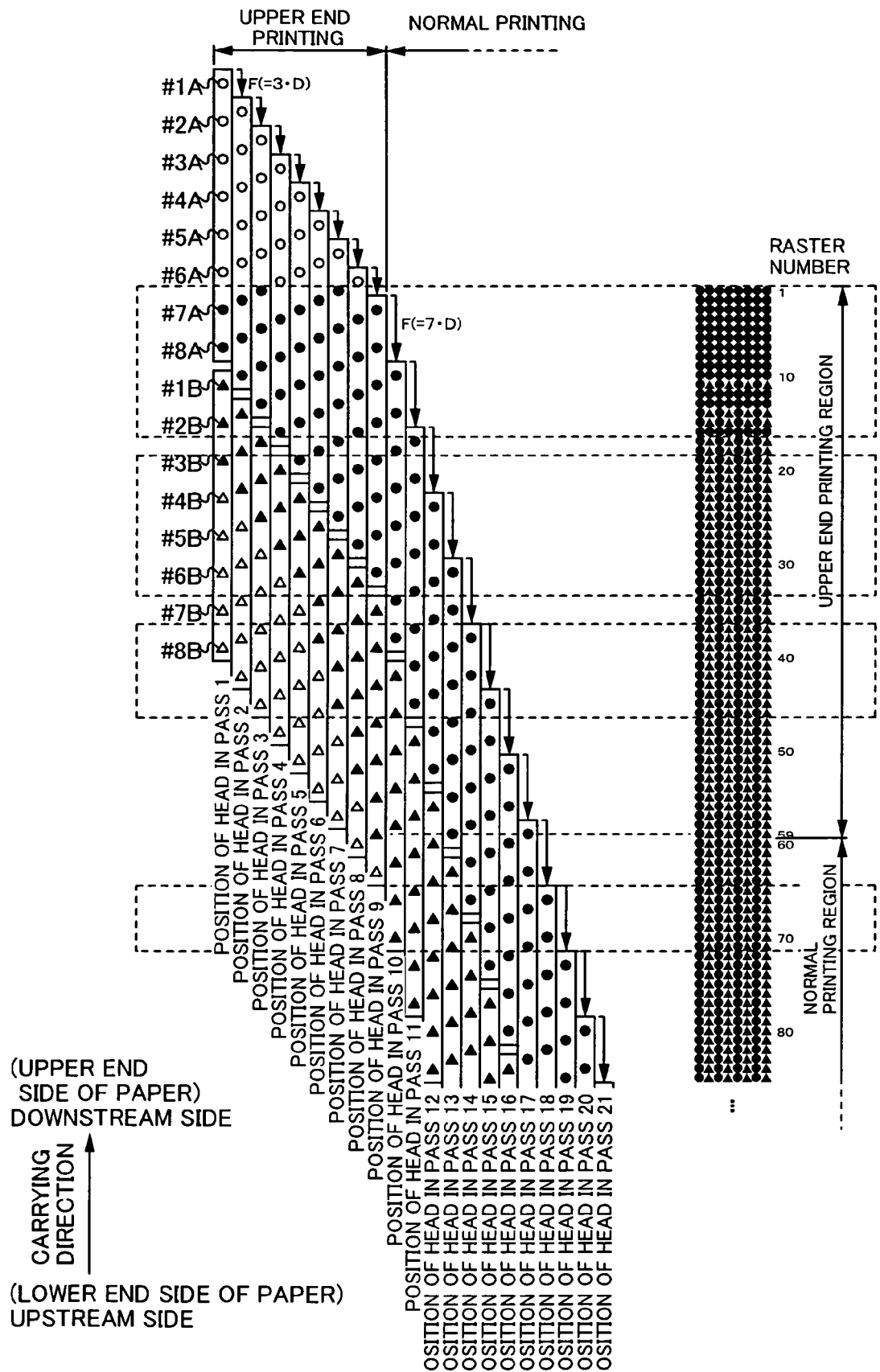
FIG. 17 is an explanatory diagram of upper end printing and normal printing.

FIG. 17 is an explanatory diagram of the upper end printing and normal printing. For the convenience of explanation, here the number of nozzles is changed and each nozzle row of the each nozzle group has eight nozzles (there are 16 nozzles in total.)

In FIG. 17, pass 1 through pass 9 are formed by the upper end printing. In the upper end printing, the carrying amount for the carrying process that is performed between passes is 3·D. In the upper end printing, nozzles of the first nozzle group 41A located in the carrying direction downstream side (upper side in FIG. 17) and nozzles of the second nozzle group 41B in the carrying direction upstream side (lower side of the diagram) do not eject ink. In FIG. 17, these nozzles that do not eject ink are indicated by open circle or open triangle. As described later, part of the nozzles are the POL nozzles.

The normal printing (non-uniform overlap printing) is performed in and after pass 10. In the normal printing, the carrying amount for the carrying process that is performed between passes is 7·D. In the normal printing, all nozzles eject ink. However, as described later, part of nozzles are the POL nozzles.

By performing the normal printing after the upper end printing as described above, successive raster lines are formed lined up in the carrying direction. It should be noted that the "upper end printing region" in the diagram refers to a region from the raster line located furthest downstream in the carrying direction to the raster line located furthest upstream in the carrying direction of raster lines formed by the upper end printing. The upper end printing region in this case means a region from the first raster line through the 59th raster line. Also, the "normal printing region" in the diagram refers to a region of raster lines formed only by the normal printing The normal printing region in this case means a region in and after the 60th raster line. However, in the upper end printing region, raster lines formed by both the upper end printing and the normal printing exist.

FIG. 18 is an explanatory diagram of the types of raster lines. From now on, each type of raster line is described while explaining how dots are formed in the four regions enclosed with dotted line in FIG. 17.

Figure 19:
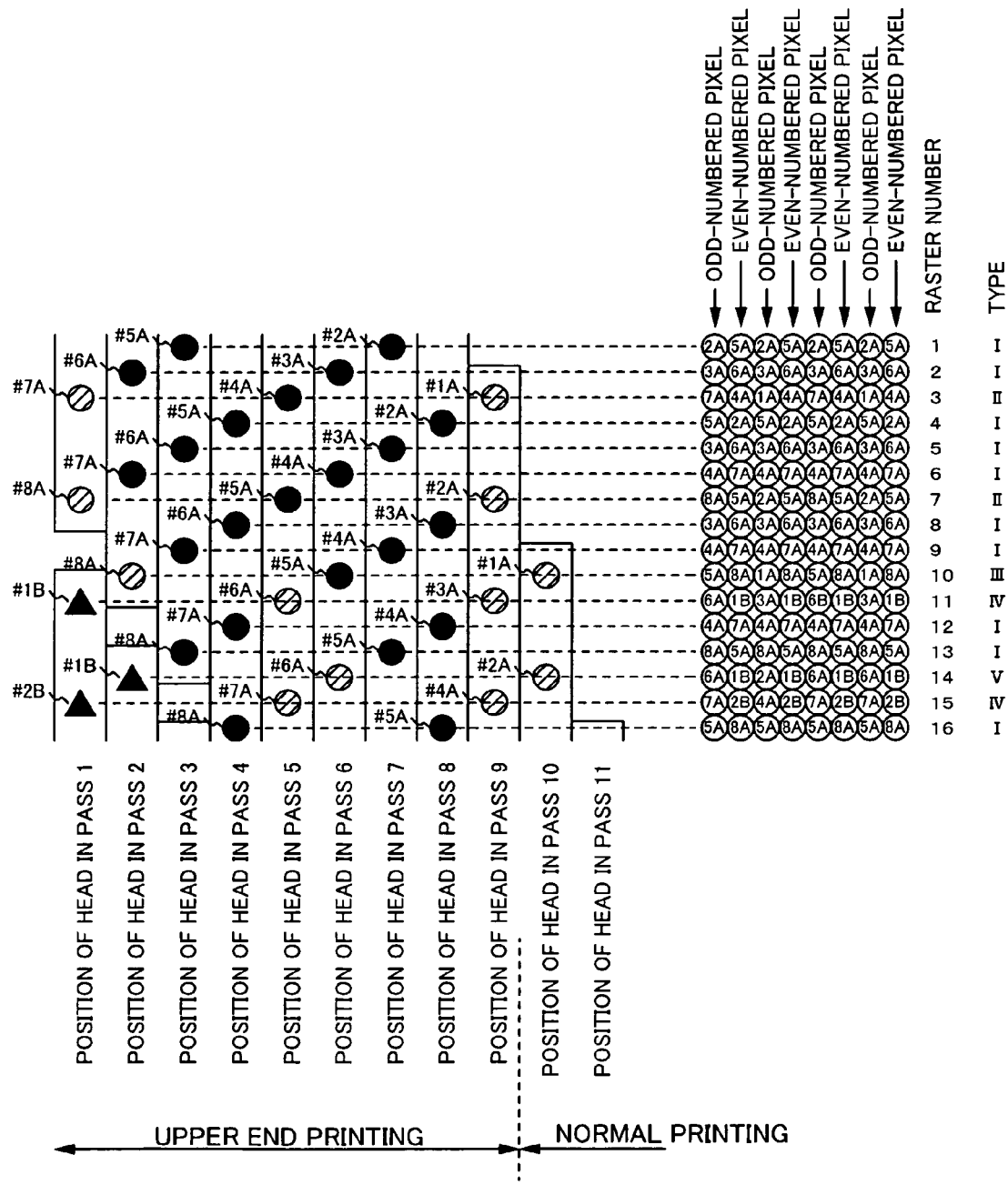
FIG. 19 is an explanatory diagram showing how dots are formed in the first through the 16th raster lines.

FIG. 19 is an explanatory diagram of how dots are formed in the first through the 16th raster line. Circles on the left side of the figure indicate the position of the nozzles of the first nozzle group, and the triangles indicate the position of the nozzles of the second nozzle group. Nozzles indicated by a solid circle and triangle represent the nozzles that form dots every other dot (at even-numbered pixels or odd-numbered pixels) as in the full overlap printing. Nozzles indicated by hatched circles represent the POL nozzles that form dots only by half of the number of the dots formed by the nozzles indicated by solid circle and triangle. Furthermore, the nozzles indicated by open circle and triangle represent nozzles that do not eject ink. In each circle on the right side of the diagram that represents a dot, the number of the nozzle which forms that dot is indicated.

The 1st through 16th raster lines are made up of the type I through type V raster lines.

The type I raster line is a raster line formed by two nozzles of the first nozzle group 41A, and is a raster line formed by two passes during the upper end printing. For example, the first, second, fourth through sixth, eighth, ninth, twelfth, thirteenth and sixteenth raster lines are type I raster lines.

The type II raster line is a raster line formed by three nozzles of the first nozzle group 41A, and is a raster line formed by three passes during the upper end printing. Since this raster line is formed by three nozzles, two nozzles of the three nozzles become the POL nozzles. For example, the third and seventh raster lines are type II raster lines.

In the type II raster lines, two nozzles become the POL nozzles. Also, it is desirable that nozzles located at the end of the nozzle group become the POL nozzles. Therefore, when forming the type II raster line, the nozzles #1A, #2A, #7A and #8A located at the ends of the first nozzle group become the POL nozzle. As a result, if there is a nozzle that has an ejection trouble, the extent of deterioration of the image quality can be small.

The type III raster line is a raster line formed by three nozzles of the first nozzle group 41A, and is a raster line formed by two passes during the upper end printing and one pass during the normal printing. Since this type of raster line is also formed by three nozzles, two nozzles of the three nozzles become the POL nozzles. For example, the 10th raster line is a type III raster line.

In the type III raster lines, two nozzles become the POL nozzles. Also, it is desirable that nozzles located at the end of the nozzle group become the POL nozzles. Therefore, when forming the type III raster line, the nozzles #1A and #8A located at the ends of the first nozzle group become the POL nozzles. As a result, if there is a nozzle that has an ejection trouble, the extent of deterioration of the image quality can be small.

Incidentally, all of the type I through type III raster lines are formed by the nozzles of the first nozzle group 41A. Therefore, for these raster lines, it is the number of dots formed by the nozzles of the first nozzle group 41A and the number of dots formed by the nozzles of the second nozzle group 41B cannot be made to be equally ½.

The type IV raster line is a raster line formed by two nozzles of the first nozzle group 41A and one nozzle of the second nozzle group 41B, and is a raster line formed by three passes during the upper end printing. Since this raster line is formed by three nozzles, two nozzles of the three nozzles become the POL nozzles. For example, the 11th and 15th raster lines are type IV raster lines.

The type V raster line is a raster line formed by two nozzles of the first nozzle group 41A and one nozzle of the second nozzle group 41B, and is a raster line formed by two passes during the upper end printing and one pass during the normal printing. Since this type of raster line is also formed by three nozzles, two nozzles of the three nozzles become the POL nozzles. For example, the 14th raster line is a type V raster line.

Incidentally, two nozzles become the POL nozzles in the type IV and type V raster lines. Also, the type IV and type V raster lines are formed by two nozzles of the first nozzle group 41A and one nozzle of the second nozzle group 41B. That is, focusing on the number of nozzles that form these raster lines, the number of nozzles of the first nozzle group 41A is larger than the number of nozzles of the second nozzle group 41B. Therefore, when forming these raster lines, two nozzles of the first nozzle group become the POL nozzles. As a result, in the type IV raster line, the number of dots formed by the nozzles of the first nozzle group 41A and the number of dots formed by the nozzles of the second nozzle group 41B are equally ½.

Figure 20:
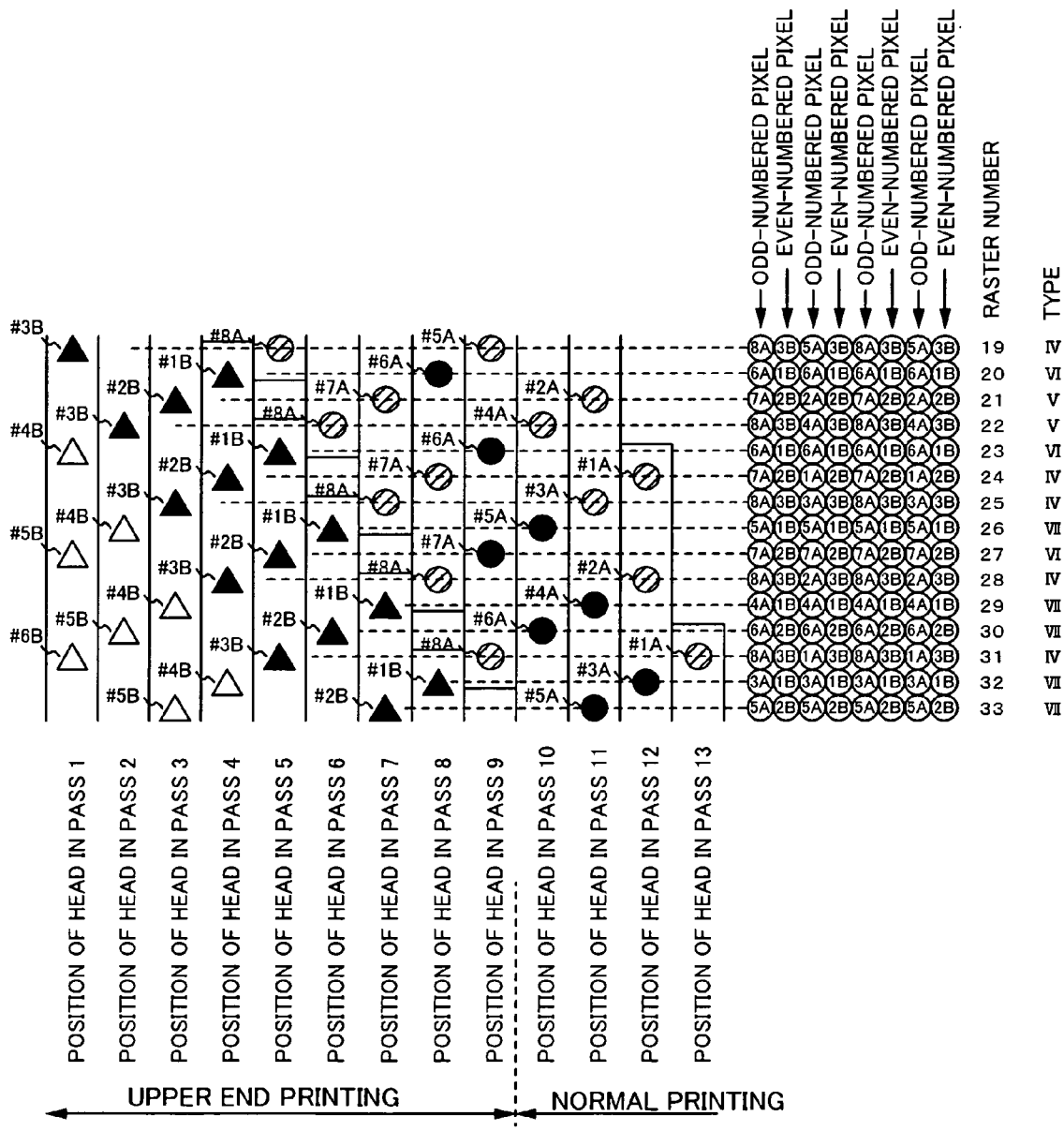
FIG. 20 is an explanatory diagram showing how dots are formed in the 19th through the 33rd raster lines.

FIG. 20 is an explanatory diagram of how dots are formed in the 19th through 33rd raster lines. The 19th through 33rd raster lines are made up of the type IV through type VII raster lines. However, description of the type IV and type V raster lines is omitted here. It should be noted that the 19th, 24th, 25th and 31st raster lines are type IV raster lines. Further, the 21st and 22nd raster lines are type V raster lines.

The type VI raster line is a raster line formed by one nozzle of the first nozzle group 41A and one nozzle of the second nozzle group 41B, and is a raster line formed by two passes during the upper end printing. For example, the 20th, 23rd and 27th raster lines are type VI raster lines.

The type VII raster line is a raster line formed by one nozzle of the first nozzle group 41A and one nozzle of the second nozzle group 41B, and is a raster line formed by one pass during the upper end printing and one pass during the normal printing. For example, the 26th, 29th, 30th, 32nd and 33rd raster lines are type VII raster lines.

Figure 21:
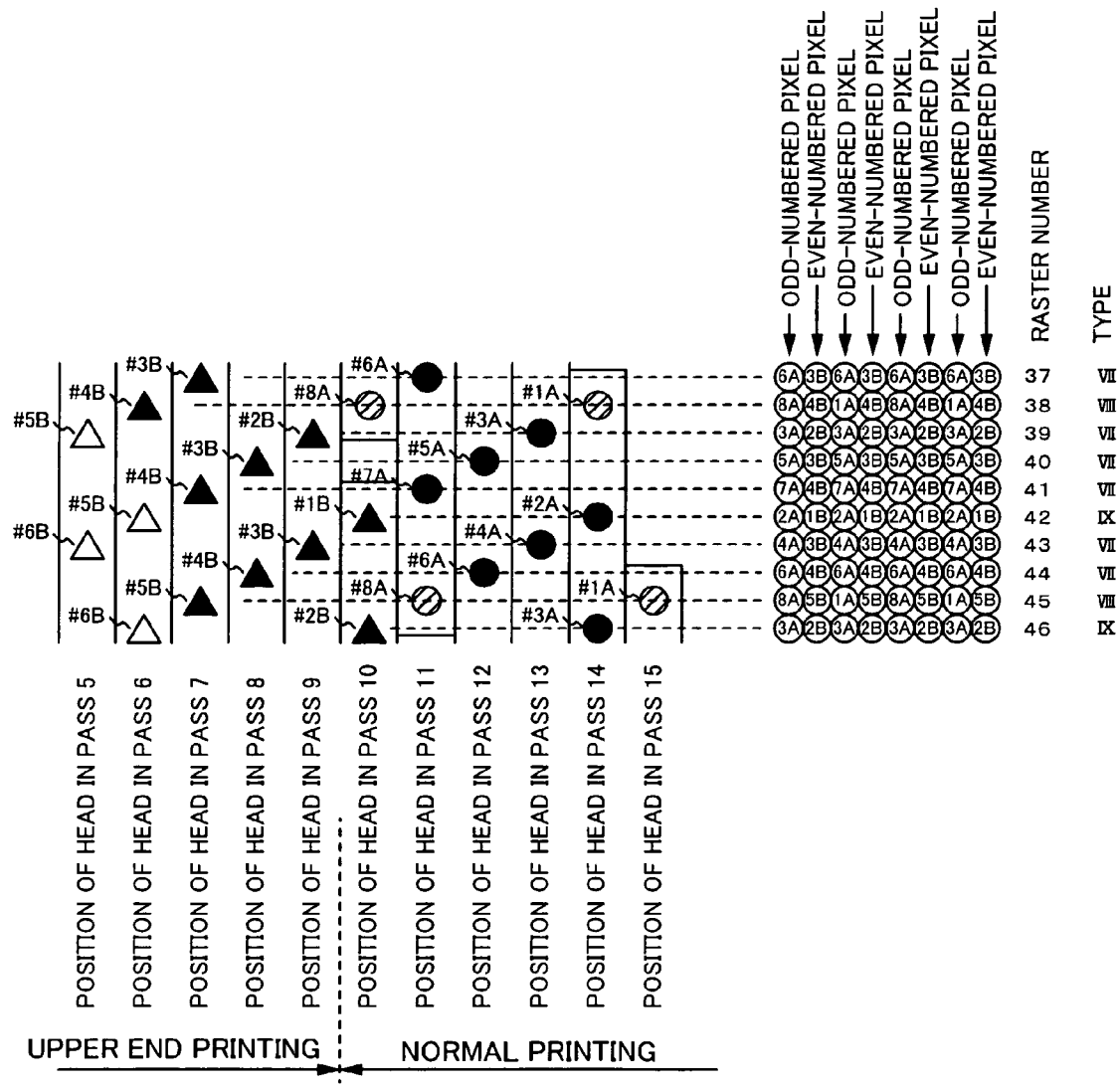
FIG. 21 is an explanatory diagram showing how dots are formed in the 37th through the 46th raster lines.

FIG. 21 is an explanatory diagram of how dots are formed in the 37th through 46th raster lines. The 37th through 46th raster lines are made up of the type VII through type IX raster lines. However, description of the type VII raster line is omitted here. It should be noted that the 37th, 39th through 41st, 43rd and 44th raster lines are type VII raster lines.

The type VIII raster line is a raster line formed by two nozzles of the first nozzle group 41A and one nozzle of the second nozzle group 41B, and is a raster line formed by one pass during the upper end printing and two passes during the normal printing. Since this type of raster line is formed by three nozzles, two nozzles of the three nozzles become the POL nozzles. For example, the 38th and 45th raster lines are type VIII raster lines.

In this type VIII raster line, two nozzles become the POL nozzles. Also, the type VIII raster line is formed by two nozzles of the first nozzle group 41A and one nozzle of the second nozzle group 41B. Specifically, focusing on the number of nozzles that form this raster line, the number of nozzles of the first nozzle group 41A is larger than the number of nozzles of the second nozzle group 41B. Therefore, when forming this raster line, two nozzles of the first nozzle group become the POL nozzles. As a result, in the type VIII raster line, the number of dots formed by the nozzles of the first nozzle group 41A and the number of dots formed by the second nozzle group 41B are equally ½.

The type IX raster line is a raster line formed by one nozzle of the first nozzle group 41A and one nozzle of the second nozzle group 41B, and is a raster line formed by two passes during the normal printing. For example, the 42nd and 46th raster lines are type IX raster lines.

Figure 22:
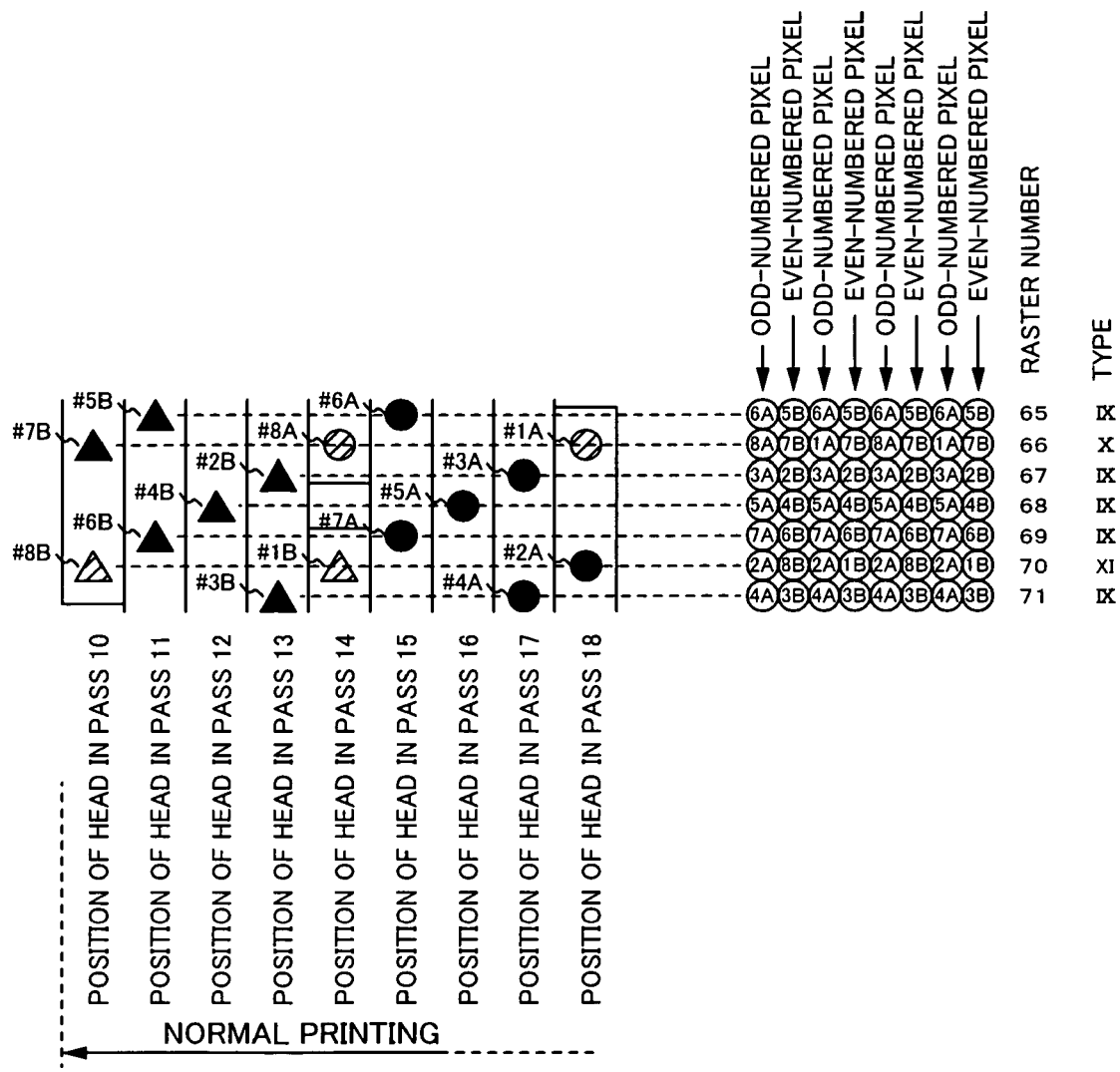
FIG. 22 is an explanatory diagram showing how dots are formed in the 65th through the 71st raster lines.

FIG. 22 is an explanatory diagram of how dots are formed in the 65th through 71st raster lines. The 65th through 71st raster lines are made up of the type IX through type XI raster lines. However, description of the type IX raster line is omitted here. It should be noted that the 65th, 67th through 69th and 71st raster lines are type IX raster lines.

The type X raster line is a raster line formed by two nozzles of the first nozzle group 41A and one nozzle of the second nozzle group 41B, and is a raster line formed by three passes during the normal printing. Since this type of raster line is formed by three nozzles, two nozzles of the three nozzles become the POL nozzles. For example, the 66th raster line is a type X raster line.

In this type X raster line, two nozzles become the POL nozzles. Also, the type X raster line is formed by two nozzles of the first nozzle group 41A and one nozzle of the second nozzle group 41B. Specifically, focusing on the number of nozzles that form this raster line, the number of nozzles of the first nozzle group 41A is larger than the number of nozzles of the second nozzle group 41B. Therefore, when forming this raster line, two nozzles of the first nozzle group become the POL nozzles. As a result, in the type X raster line, the number of dots formed by the nozzles of the first nozzle group 41A and the number of dots formed by the second nozzle group 41B are equally ½.

The type XI raster line is a raster line formed by one nozzle of the first nozzle group 41A and two nozzles of the second nozzle group 41B, and is a raster line formed by three passes during the normal printing. Since this type of raster line is formed by three nozzles, two nozzles of the three nozzles become the POL nozzles. For example, the 70th raster line is a type XI raster line.

In this type XI raster line, two nozzles become the POL nozzles. Also, the type X raster line is formed by one nozzle of the first nozzle group 41A and two nozzles of the second nozzle group 41B. Specifically, focusing on the number of nozzles that form this raster line, the number of nozzles of the first nozzle group 41A is smaller than the number of nozzles of the second nozzle group 41B, which is opposite to the type X raster line. Therefore, when forming this raster line, two nozzles of the second nozzle group become the POL nozzles. As a result, in the type XI raster line, the number of dots formed by the nozzles of the first nozzle group 41A and the number of dots formed by the second nozzle group 41B are equally ½.

Note that, in the normal printing, the carrying amount for the carrying process that is performed between passes is 7·D, which is equal to the width of seven raster lines. Therefore, in the normal printing region, similar dot formation is performed in a cycle of seven raster lines. For example, seven raster lines from 65th through 71st raster lines are formed in pass 10 through pass 18 with the dot arrangement as shown in the diagram. The following 72nd through the 78th raster lines are formed with the same dot arrangement as the 65th through 71st raster lines that are formed by pass 11 through pass 19.

Accordingly, almost all of the raster lines in the normal printing region are the type IX raster line, and the type X raster line and the type XI raster line appear once in every seven raster lines. In addition, when printing an image on paper of A4 size, for example, several thousands of raster lines are formed in the normal printing region. Therefore, comparing the upper end printing region and the normal printing region, the number of raster lines in the normal printing region is larger than that in the upper end printing region. For this reason, almost all of the raster lines that configure the entire printed image are the type IX raster line.

Furthermore, while the number of nozzles is reduced from the actual number of nozzles in the foregoing description to simplify the explanation, assuming a case in which each nozzle group has 180 nozzles (has 360 nozzles in total), in order to perform the non-uniform overlap printing in the same manner, the carrying process is performed with the carrying amount of 179·D. In this case, in the normal printing region, similar dot formation is performed in a cycle of 179 raster lines. Then, of the 179 raster lines, 177 raster lines are the type IX raster line, and one each of the type X and type XI raster lines are included. In short, most of the raster lines in the normal printing region are the type IX raster line.

Therefore, in order to achieve uniform image quality over the entire printed image, it is desirable that dots of raster lines other than the type IX raster line are formed in the same manner as the type IX raster line. In other words, if there are many raster lines in which the dots are formed in the same manner as the type IX raster line, the image quality over the entire printed image can be uniform.

The type X raster line in the normal printing region of the present embodiment is the same as the second and the fifth raster lines in the above-described first embodiment (see FIGS. 15 and 16), and two nozzles in the first nozzle group 41A become the POL nozzles. Further, the type XI raster line of the present embodiment is the same as the third and sixth raster lines in the above-described first embodiment, and two nozzles of the second nozzle group 41B become the POL nozzles. Accordingly, in both of the type X and type XI raster lines, the number of dots formed by the nozzles of the first nozzle group 41A and the number of dots formed by the second nozzle group 41B are equally ½. As a result, dots of the type X and type XI raster lines are formed in the same manner as the type IX raster line, so that the image quality in the normal printing region can be uniform.

Further, in the present embodiment, unlike the above-described first embodiment, as the type V and type VIII raster lines for example, some raster lines are formed by the pass during the upper end printing and the pass during the normal printing. In the present embodiment, concerning those raster lines as well, the nozzles of the nozzle group that are larger in number of the nozzles for forming those raster lines become the POL nozzles. As a result, in the type V and type VIII raster lines as well, the number of dots formed by the nozzles of the first nozzle group 41A and the number of dots formed by the second nozzle group 41B are equally ½. As a result, dots of the type V and type VIII raster lines are formed in the same manner as the type IX raster line, so that the image quality in the upper end printing region can be uniform.

Similarly, in the present embodiment, unlike the above-described first embodiment, as the type III raster line for example, even in the raster line formed only by the pass during the upper end printing, the nozzles of the nozzle group that are larger in number of the nozzles for forming that raster line become the POL nozzles. As a result, in the type III raster line as well, the number of dots formed by the nozzles of the first nozzle group 41A and the number of dots formed by the nozzles of the second nozzle group 41B are equally ½. As a result, dots of the type III raster line are formed in the same manner as the type IX raster line, so that the image quality in the upper end printing region can be uniform.

Further, focusing on the nozzles that form the type X raster line of the present embodiment, the nozzles #1A and #8A located at the end of the first nozzle group 41A are the POL nozzles. Therefore, even if these nozzles have an ejection problem, the extent of deterioration of the image quality can be small. Similarly, focusing on the nozzles that form the type XI raster line of the present embodiment, the nozzles #1B and #8B located at the end of the second nozzle group 41B are the POL nozzles. Therefore, even if these nozzles have an ejection problem, the extent of deterioration of the image quality can be small.

Not only in the raster lines in the normal printing region such as the type X and type XI raster lines, but also in the raster lines in the upper end printing region such as the type IV, type V and type VIII raster lines, nozzles located at the end of the first nozzle group 41A that form those raster lines are the POL nozzles. Then, the nozzle #1A located at the end of the first nozzle group 41A is the POL nozzle. Therefore, even if these nozzles have an ejection problem, the extent of deterioration of the image quality can be small.

In the present embodiment, the nozzle #4B in passes 1 through 5 did not eject ink. However, there is no limitation to this. For example, that nozzle may eject ink. In this case, the nozzle #4B in passes 1 through 5 functions as the POL nozzle, and accordingly the nozzle #1B in pass 5 through pass 9 also becomes the POL nozzle. Similarly, the nozzle #5B in pass 6, the nozzle #6B in pass 7, the nozzle #7B in pass 8, and the nozzle #8 in pass 9 may be the POL nozzle. In this case, the nozzle #1B in passes 10 through 13 functions as the POL nozzle. As a result, even if the nozzle #1B has an ejection problem, the extent of deterioration of the image quality can be small.

Other Embodiments

The foregoing embodiments described primarily a printer. However, it goes without saying that the foregoing description also includes the disclosure of printing apparatuses, recording apparatuses, liquid ejection apparatuses, printing methods, recording methods, liquid ejection methods, printing systems, recording systems, computer systems, programs, storage media storing programs, display screens, screen display methods, and methods for producing printed material, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes functional equivalents. In particular, embodiments mentioned below are also included in the present invention.

Regarding the Printers

In the above embodiments, a printer was described. However, there is no limitation to this. For example, technology similar to that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Moreover, methods and manufacturing methods of these are also within the scope of application. Also when applying the present technology to these fields, the feature that liquid can be directly ejected (written) to a target object allows a reduction in material, process steps, and costs compared to conventional cases.

Regarding the Ink

Since the foregoing embodiments were embodiments of a printer, a dye ink or a pigment ink was ejected from the nozzles. However, the liquid that is ejected from the nozzles is not limited to such inks. For example, it is also possible to eject from the nozzles a liquid (including water) including metallic material, organic material (particularly macromolecular material), magnetic material, conductive material, wiring material, film-formation material, electronic ink, processed liquid, and genetic solutions. A reduction in material, process steps, and costs can be achieved if such liquids are directly ejected toward a target object.

Regarding the Nozzles

In the foregoing embodiments, ink was ejected using piezoelectric elements. However, the method for ejecting liquid is not limited to this. Other methods, such as a method for generating bubbles in the nozzles through heat, may also be employed.

Regarding the Raster Lines

In the foregoing embodiments, dots were formed for all pixels lined up in the carriage moving direction. However, this is a result of a case in which pixel data corresponding to all pixels is data that indicate "dot formation". If a pixel data corresponding to a certain pixel is data that indicates "no dot formation", no dot is formed for the pixel corresponding to that pixel data. In other words, although a raster line means a plurality of dots along the moving direction, it is not required that dots are formed for all pixels.

Summary (1) The above-described printer includes the carry unit 20, the first nozzle group 41A and the second nozzle group 41B, and the controller 60. The carry unit 20 carries a medium in the carrying direction. The first nozzle group 41A and the second nozzle group 41B respectively include a plurality of nozzles lined up in the carrying direction (see FIG. 5). The controller 60 alternately repeats the dot forming process and the carrying process by controlling each unit, to form raster lines successively in the carrying direction, so as to print an image to be printed on paper (an example of the media).

By the way, when the non-uniform overlap printing is performed, as raster lines of type IV, type V, type VIII, type X and type XI, the number of nozzles to form these raster lines differs for each nozzle group. For example, the type X raster line is formed by two nozzles of the first nozzle group 41A and one nozzle of the second nozzle group 41B, and the number of nozzles that form the type X raster line differs for each nozzle group. Further, the type XI raster line is formed by one nozzle of the first nozzle group 41A and two nozzles of the second nozzle group 41B, and the number of nozzles that form the type XI raster line differs for each nozzle group.

If each of the nozzle forms dots at the same ratio in those raster lines, the raster lines thus formed reflect strong effects of a particular nozzle group. For example, the type X raster line reflects a strong effect of the first nozzle group 41A, and the type XI raster line reflects a strong effect of the second nozzle group 41B. As a result, if the ink ejection characteristic differs for each nozzle group, densities in respective raster lines may be inconsistent, and a striped pattern may appear in the printed image.

Accordingly, if the number of nozzles that form a certain raster line differs for each nozzle group, nozzles of the nozzle group that are smaller in number in forming that raster line form more dots constituting that raster line than nozzles of the nozzle group that are larger in number in forming that raster line. For example, regarding the type X raster line, the nozzle #1A and #8A of the first nozzle group 41A become the POL nozzles, and the ratio of dots formed by each of these nozzles (¼) is made smaller than the ratio of dots formed by the nozzle #7B of the second nozzle group 41B (½) (see FIG. 22). In the case of the type XI raster line, the nozzles #1B and #8B of the second nozzle group 41B become the POL nozzles, the ratio of dots formed by each of these nozzles (¼) is made smaller than the ratio of dots formed by the nozzle #2A of the first nozzle group 41A (½) (see FIG. 22).

In this way, it is possible to form raster lines without strongly reflecting the effect of one of the nozzle groups, so that the image quality of the printed image can be uniform.

(2) Nozzles located at the end portions in the carrying direction of each nozzle group tend to have an ejection trouble. For this reason, it is desirable that the POL nozzle includes nozzles located at the end portions (for example, in the second embodiment, the nozzles #1A and #8A of the first nozzle group 41A, the nozzles #1B and #8B of the second nozzle group 41B). In this way, it is possible to reduce the number of dots formed by nozzles that have an ejection problem, and suppress deterioration of the image quality.

(3) Note that, it is desirable that nozzles located at the both ends of the nozzle group become the POL nozzles. By satisfying this condition, it is possible to increase the print speed.

For example, when forming the 66th raster line, the nozzles #1A and #8A located at the both ends of the first nozzle group become the POL nozzles (see FIG. 22). In this case, after pass 14 for forming dots by the nozzle #8A until pass 18 for forming dots by the nozzle #1A, carrying process by the carrying amount of 28·D in total (=7·D×4 times) is carried out.

In contrast, when forming the 24th raster line, the nozzles #1A and #7A become the POL nozzles (see FIG. 20), and the nozzle #7A is not a nozzle located at the farthest end of the first nozzle group. Therefore, after pass 8 for forming dots by the nozzle #7A until pass 12 for forming dots by the nozzle #1A, carrying process by the carrying amount of 24·D in total (=3·D×1 time+7·D×3 times) is carried out.

In other words, if the above condition is not satisfied, the carrying amount is reduced and the print speed becomes slower.

(4) In the foregoing embodiments, a plurality of piezo elements (an example of the drive element) are provided so as to respectively correspond to a plurality of nozzles. The piezo elements that respectively correspond to the plurality of nozzles of the same nozzle group are constituted by the same drive unit 42 (see FIG. 6). Therefore, the ink ejection characteristics of the nozzles of the same nozzle group have much in common. On the other hand, piezo elements of different nozzle groups are respectively configured by separate drive units 42. Consequently, the respective nozzle groups tend to have different ink ejection characteristics.

It should be noted that with such a configuration, the extent of deterioration of the image quality can be small.

(5) In the "non-uniform overlap printing", the number of nozzles that form each raster line differs according to the raster line. For example, in the foregoing embodiments, the number of nozzles used is two or three according to the raster line. In this printing method, density of raster lines tends to be inconsistent. However, with the present embodiment, such an inconsistent density of the raster line can be suppressed.

(6) In the foregoing embodiments, the ratio of dots formed by the nozzles of the first nozzle group 41A and the ratio of dots formed by the nozzles of the second nozzle group 41B are equally ½. Consequently, it is possible to form raster lines without strongly reflecting the effect of one of the nozzle groups, so that the image quality of the printed image can be uniform.

(7) In the foregoing embodiments, for example, the number of nozzles that form the type IX raster line is one for each nozzle group. The ratio of the dots formed by the nozzle of the first nozzle group 41A to the dots configuring the type IX raster line is ½. The ratio of the dots formed by the nozzle of the first nozzle group 41A to the dots configuring the type X raster line is also ½. In this way, it is possible to form dots in the type X raster line and the type IX raster line in the same manner, so that the image quality of the entire printed image can be uniform.

(8) The above-described POL nozzle is a nozzle for which the number of dots formed by that nozzle is reduced by half. However, it is not necessarily required to reduce the number by exactly half. Especially, when the overlap number M is not 2 but a far larger number, two or more redundant nozzles may be allocated to a certain raster line. In such a case, the number of dots formed by the POL nozzles can be half or lower.

(9) It is desirable to include all the components described above, because it is possible to achieve all the effects of the present invention. However, it is possible to improve the image quality of the printed image even if not all of the above-described components are included.

(10) It goes without saying that the foregoing embodiment contains disclosure of printing methods, in addition to printing apparatuses.

(11) The computer 110 (an example of the printing control apparatus) outputs print data to the printer 1. This print data contains command data that indicates the carrying amount during the carrying process, or pixel data that indicates pixels for which dots should be formed in each pass. The printer 1 performs printing as shown in FIG. 17, for example, based on this print data.

(12) The foregoing printer driver (an example of the program) causes the computer 110 to generate that print data and output the print data to the printer 1. In this way, the printer driver causes the printer 1 to perform printing as shown in FIG. 17, for example.

What is claimed is:

1. A printing method comprising:
   preparing a printing apparatus provided with:
   a transport unit that transports a medium in a transporting direction, and
   a plurality of nozzle groups that respectively have a plurality of nozzles lined up at a constant spacing in the transporting direction, wherein a certain nozzle group and another nozzle group among said plurality of nozzle groups eject same ink, said certain nozzle group is located downstream in the transporting direction from said another nozzle group, a nozzle of said certain nozzle group located most upstream in the transporting direction is located downstream in the transporting direction from a nozzle of said another nozzle group located most downstream in the transporting direction, and said certain nozzle group and said another nozzle group are located at different positions with respect to the moving direction; and
   printing an image to be printed on the medium by:
   alternately repeating a dot forming process for forming dots on the medium by ejecting ink from each nozzle of a plurality of the nozzle groups that move in a moving direction, and a transporting process for transporting the medium in the transporting direction, and
   forming a plurality of rows of dots lined up in the transporting direction, each row of dots being configured by a plurality of dots lined up in the moving direction,
   wherein in case where a certain row of dots is to be formed by at least one nozzle of said certain nozzle group and at least one nozzle of said another nozzle group and where the number of nozzles of the certain nozzle group that are to form the certain row of dots is smaller than the number of nozzles of the another nozzle group that are to form the certain row of dots,
   each nozzle of the certain nozzle group forms a larger number of dots configuring the certain row of dots than each nozzle of the another nozzle group.

2. A printing method according to claim 1,
   wherein, in a case a certain row of dots is formed by a plurality of the nozzles, if, of a plurality of the nozzles that form the certain row of dots, the number of nozzles of a certain nozzle group is smaller than, of a plurality of the nozzles that form the certain row of dots, the number of nozzles of another nozzle group,
   the nozzles of the another nozzle group, that form the certain row of dots, include a nozzle located in an end portion in the transporting direction in the another nozzle group.

3. A printing method according to claim 2,
   wherein a nozzle located in a furthest downstream side in the transporting direction and a nozzle located in a furthest upstream side in the transporting direction of the another nozzle group form the certain row of dots.

4. A printing method according to claim 1,
   wherein a plurality of drive elements for causing ink to be ejected from the nozzles are provided respectively corresponding to each of a plurality of the nozzles, and drive elements corresponding to nozzles of different nozzle groups are each configured separately.

5. A printing method according to claim 1,
   wherein the number of nozzles that form a row of dots differs according to the row of dots.

6. A printing method according to claim 1,
   wherein with respect to dots configuring the certain row of dots, a ratio of dots formed by the nozzles of the certain nozzle group is equal to a ratio of dots formed by the nozzles of the another nozzle group.

7. A printing method according to claim 1,
   wherein in a case the number of the nozzle of the certain nozzle group and the number of the nozzle of the another nozzle group that form a different row of dots from the certain row of dots are the same,
   a ratio of dots formed by nozzles of the another nozzle group to dots configuring the different row of dots is equal to a ratio of dots formed by nozzles of the another nozzle group to dots configuring the certain row of dots.

8. A printing method according to claim 1,
   wherein each nozzle of the another nozzle group forms a half of the number of dots formed by each nozzle of the certain nozzle group.

9. A printing apparatus comprising:
   a transport unit that carries a medium in a transporting direction;
   a plurality of nozzle groups that respectively have a plurality of nozzles lined up at a constant spacing in the transporting direction, wherein a certain nozzle group and another nozzle group among said plurality of nozzle groups eject same ink, said certain nozzle group is located downstream in the transporting direction from said another nozzle group, a nozzle of said certain nozzle group located most upstream in the transporting direction is located downstream in the transporting direction from a nozzle of said another nozzle group located most downstream in the transporting direction, and said certain nozzle group and said another nozzle group are located at different positions with respect to the moving direction; and
   a controller that causes to print an image to be printed on the medium by:
   alternately repeating a dot forming process for forming dots on the medium by ejecting ink from each nozzle of a plurality of the nozzle groups that move in a moving direction, and a transporting process for transporting the medium in the transporting direction, and
   forming a plurality of rows of dots, lined up in the transporting direction, that are configured by a plurality of dots lined up in the moving direction,
   wherein in a case where a certain row of dots is to be formed by at least one nozzle of said certain nozzle group and at least one nozzle of said another nozzle group, and where the number of nozzles of the certain nozzle group that are to form the certain row of dots is smaller than the number of nozzles of the another nozzle group that arc to form the certain row of dots,
   each nozzle of the certain nozzle group is made to form a larger number of dots configuring the certain row of dots than each nozzle of the another nozzle group.

10. A printing control apparatus comprising a driver for controlling a printing apparatus, wherein the printing apparatus has:
    a transport unit that transports a medium in a transporting direction, and a plurality of nozzle groups that respectively have a plurality of nozzles lined up at a constant spacing in the transporting direction, wherein a certain nozzle group and another nozzle group among said plurality of nozzle groups eject same ink, said certain nozzle group is located downstream in the transporting direction from said another nozzle group, a nozzle of said certain nozzle group located most upstream in the transporting direction s located downstream in the transporting direction from a nozzle of said another nozzle group located most downstream in the transporting direction, and said certain nozzle group and said another nozzle group are located at different positions with respect to the moving direction;

wherein the driver causes to print an image to be printed on the medium by:
- alternately repeating a dot forming process for forming dots on the medium by ejecting ink from each nozzle of a plurality of the nozzle groups that move in a moving direction, and a transporting process for transporting the medium in the transporting direction, and
- forming a plurality of rows of dots lined up in the transporting direction, each row of dots being configured by a plurality of dots lined up in the moving direction, and wherein in a case where a certain row of dots is to be formed by at least one nozzle of said certain nozzle group and at least one nozzle of said another nozzle group, and where the number of nozzles of the certain nozzle group that are to form the certain row of dots is smaller than the number of nozzles of another nozzle group that are to form the certain row of dots, each nozzle of the certain nozzle group forms a larger number of dots configuring the certain row of dots than each nozzle of the another nozzle group.

11. A storage medium storing a driver for controlling a printing apparatus, wherein the printing apparatus has:
a transport unit that carries a medium in a transporting direction, and
a plurality of nozzle groups that respectively have a plurality of nozzles lined up at a constant spacing in the transporting direction, wherein a certain nozzle group and another nozzle group among said plurality of nozzle groups eject same ink, said certain nozzle group is located downstream in the transporting direction from said another nozzle group, a nozzle of said certain nozzle grot p located most upstream in the transporting direction is located downstream in the transporting direction from a nozzle of said another nozzle group located most downstream in the transporting direction, and said certain nozzle group and said another nozzle group are located at different positions with respect to the moving direction, wherein the driver has:
- a code for causing the printing apparatus to print an image to be printed on the medium by:
  - alternately repeating a dot forming process for forming dots on the medium by ejecting ink from each nozzle of a plurality of the nozzle groups that move in a moving direction, and a transporting process for transporting the medium in the transporting direction, and
  - forming a plurality of the rows of dots lined up in the transporting direction, each row of dots being configured by a plurality of dots lined up in the moving direction, wherein in a case where a certain row of dots is to be formed by at least one nozzle of a certain nozzle group and at least one nozzle of said another nozzle group, and where the number of nozzles of the certain nozzle group that are to form the certain row of dots is smaller than the number of nozzles of the another nozzle group that are to form the certain row of dots, each nozzle of the certain nozzle group forms a larger number of dots configuring the certain row of dots than each nozzle of the another nozzle group.

* * * * *